(12) United States Patent
Jones et al.

(10) Patent No.: US 8,446,509 B2
(45) Date of Patent: May 21, 2013

(54) METHODS OF CREATING A VIRTUAL WINDOW

(75) Inventors: Peter W. J. Jones, Belmont, MA (US); Dennis W. Purcell, Medford, MA (US)

(73) Assignee: Tenebraex Corporation, Boston, MA (US)

( * ) Notice: Subject to any disclaimer, the term of this patent is extended or adjusted under 35 U.S.C. 154(b) by 458 days.

(21) Appl. No.: 11/891,682

(22) Filed: Aug. 9, 2007

(65) Prior Publication Data

US 2008/0036875 A1 Feb. 14, 2008

Related U.S. Application Data

(60) Provisional application No. 60/836,727, filed on Aug. 9, 2006.

(51) Int. Cl.
*H04N 5/222* (2006.01)

(52) U.S. Cl.
USPC .................................. 348/333.03; 348/333.11

(58) Field of Classification Search
USPC ............ 348/36, 38, 39, 211.99, 211.4, 211.8, 348/211.11, 333.03
See application file for complete search history.

(56) References Cited

U.S. PATENT DOCUMENTS

| | | |
|---|---|---|
| 3,863,207 A | 1/1975 | Galella et al. |
| 4,253,083 A | 2/1981 | Imamura et al. |
| 4,534,650 A | 8/1985 | Clerget et al. |
| 4,628,466 A | 12/1986 | Tymes |
| 5,103,306 A | 4/1992 | Weiman et al. |
| 5,416,392 A | 5/1995 | Lee et al. |
| 5,432,871 A | 7/1995 | Novik |
| 5,495,576 A | 2/1996 | Ritchey |
| 5,581,399 A | 12/1996 | Abe |
| 5,657,073 A | 8/1997 | Henley et al. |
| 5,668,593 A | 9/1997 | Lareau et al. |
| 5,710,560 A | 1/1998 | Cohn |
| 5,760,826 A | 6/1998 | Nayar |
| 5,777,675 A | 7/1998 | Miida et al. |
| 5,961,571 A | 10/1999 | Gorr et al. |
| 6,018,349 A | 1/2000 | Szeliski et al. |
| 6,127,943 A | 10/2000 | Tauchi et al. |
| 6,144,406 A | 11/2000 | Girard et al. |
| 6,210,006 B1 | 4/2001 | Menozzi et al. |
| 6,282,330 B1 | 8/2001 | Yokota et al. |
| 6,591,008 B1 | 7/2003 | Surve et al. |

(Continued)

FOREIGN PATENT DOCUMENTS

| | | |
|---|---|---|
| EP | 1 341 383 A2 | 9/2003 |
| JP | 2001/014591 | 1/2001 |

(Continued)

OTHER PUBLICATIONS

Nicolescu et al., "GlobeAll: Panoramic Video for an Intelligent Room", Integrated Media Systems Center, University of Southern California, Los Angeles, CA, Nov. 16, 2006.

(Continued)

*Primary Examiner* — Timothy J Henn
(74) *Attorney, Agent, or Firm* — Ropes & Gray LLP

(57) ABSTRACT

The systems and methods for real time transmission of an image from an image sensor having a field of view to a processor for selectively adjusting a resolution of the image as a function of a viewer's focus point.

14 Claims, 35 Drawing Sheets

U.S. PATENT DOCUMENTS

| | | |
|---|---|---|
| 6,611,241 B1 | 8/2003 | Firester et al. |
| 6,650,772 B1 | 11/2003 | Inoue et al. |
| 6,679,615 B2 | 1/2004 | Spearing |
| 6,707,393 B1 | 3/2004 | Moore |
| 6,778,207 B1 | 8/2004 | Lee et al. |
| 6,781,618 B2 | 8/2004 | Beardsley |
| 6,836,287 B1 * | 12/2004 | Nakahara ............. 348/211.12 |
| 6,851,809 B1 | 2/2005 | Sachtler |
| 6,895,256 B2 | 5/2005 | Harma et al. |
| 6,977,685 B1 * | 12/2005 | Acosta-Serafini et al. ... 348/308 |
| 7,015,954 B1 | 3/2006 | Foote et al. |
| 7,072,107 B2 | 7/2006 | Filipovich et al. |
| 7,084,904 B2 | 8/2006 | Liu et al. |
| 7,084,905 B1 | 8/2006 | Nayar et al. |
| 7,106,374 B1 * | 9/2006 | Bandera et al. ............. 348/308 |
| 7,129,981 B2 * | 10/2006 | Berstis .................. 348/333.12 |
| 7,135,672 B2 | 11/2006 | Land |
| 7,146,032 B2 | 12/2006 | Jung et al. |
| 7,268,803 B1 | 9/2007 | Murata et al. |
| 7,277,118 B2 | 10/2007 | Foote |
| 7,335,868 B2 | 2/2008 | Liao et al. |
| 7,385,626 B2 | 6/2008 | Aggarwal et al. |
| 7,450,165 B2 | 11/2008 | Ahiska |
| 7,529,424 B2 | 5/2009 | Ahiska |
| 7,688,374 B2 | 3/2010 | Land |
| 7,747,068 B1 * | 6/2010 | Smyth et al. .................. 382/154 |
| 2001/0019363 A1 | 9/2001 | Katta et al. |
| 2002/0003573 A1 | 1/2002 | Yamaguchi et al. |
| 2002/0126914 A1 | 9/2002 | Kotake et al. |
| 2002/0141614 A1 * | 10/2002 | Lin ............................. 382/103 |
| 2003/0151689 A1 | 8/2003 | Murphy |
| 2004/0027451 A1 | 2/2004 | Baker |
| 2004/0086186 A1 | 5/2004 | Kyusojin et al. |
| 2004/0150641 A1 | 8/2004 | Duiker |
| 2004/0196379 A1 | 10/2004 | Chen et al. |
| 2004/0212677 A1 | 10/2004 | Uebbing |
| 2004/0247173 A1 | 12/2004 | Nielsen et al. |
| 2005/0036067 A1 | 2/2005 | Ryal et al. |
| 2005/0141607 A1 | 6/2005 | Kaplinsky |
| 2005/0206873 A1 | 9/2005 | Tanaka et al. |
| 2006/0017807 A1 | 1/2006 | Lee et al. |
| 2006/0031917 A1 | 2/2006 | Winder et al. |
| 2006/0125921 A1 | 6/2006 | Foote |
| 2006/0170614 A1 * | 8/2006 | Tzong et al. .................. 345/1.3 |
| 2006/0187305 A1 | 8/2006 | Trivedi et al. |
| 2006/0250505 A1 | 11/2006 | Gennetten et al. |
| 2007/0159535 A1 | 7/2007 | Kumagai et al. |
| 2007/0223904 A1 | 9/2007 | Bloom et al. |

FOREIGN PATENT DOCUMENTS

| | | |
|---|---|---|
| JP | 2001094857 A | 4/2001 |
| JP | 2001320616 A | 11/2001 |
| JP | 2003141562 A | 5/2003 |
| JP | 2004072694 A | 3/2004 |
| JP | 2004328736 A | 11/2004 |
| JP | 2005051318 A | 2/2005 |
| WO | WO-00/70486 A | 11/2000 |
| WO | WO-02/065762 A | 8/2002 |

OTHER PUBLICATIONS

Niefeld, M. et al., "Projects—Camera Array Demonstrator", Distant Focus Corporation, <http://www.distantfocus.com/projects/icis/>, 2000.

Extended European Search Report for European Application No. EP 08 84 8695 mailed Jan. 21, 2011.

International Search Report and Written Opinion for PCT/US 09/01999 dated Mar. 20, 2012.

* cited by examiner section

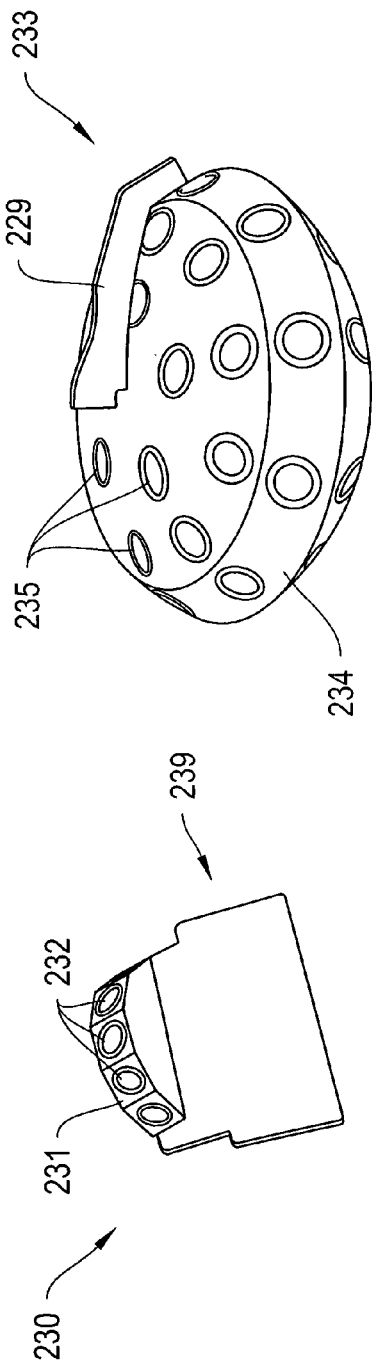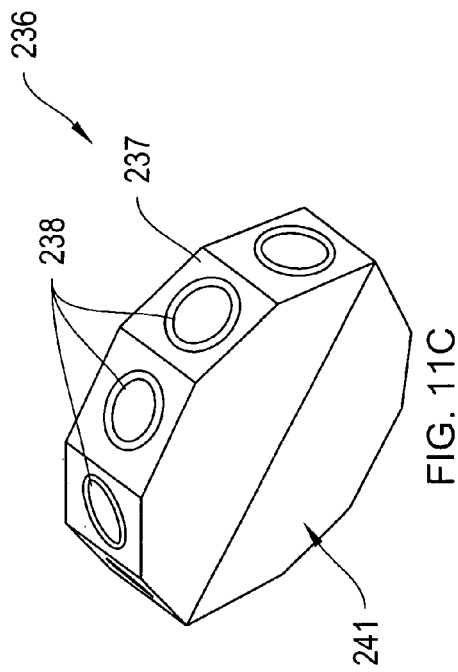
FIG. 11A
FIG. 11B
FIG. 11C

METHODS OF CREATING A VIRTUAL WINDOW

REFERENCE TO RELATED APPLICATIONS

This application claims the benefit of U.S. Provisional Application Ser. No. 60/836,727 filed on Aug. 9, 2006. The teachings of the foregoing application are hereby incorporated by reference herein in their entirety.

BACKGROUND

Today, there are inexpensive sensors that can collect data, including image data, and store that data in a computer readable format. One example of such a sensor is the CCD image sensor. Software programs can then access the stored data and manipulate and process the data to extract useful information.

The low cost of these sensors and the ready availability of computer programs to process data generated from these sensors has led to a host of new applications and devices, including inexpensive video cameras suited to videophone and image capture applications.

One disadvantage of these low cost devices has been the limited field-of-view (FOV) they cover. Given their low cost, engineers have attempted to use multiple sensors to increase the field of view. As each sensor captures a separate field of view, any system that employs multiple sensors, must also have a system that integrates the different fields-of-view together to create one image or one set of data. The data sets are integrated into a single composite data set that can be viewed by the user. In some applications, these sensor systems are placed at a remote location and the captured image data is transmitted, often by wireless transmission, to the user. Although these system can work quite well to capture the image data, there can be an issue when the data set is large, which is common for a high resolution image. Specifically, the transmission rate may be insufficient to transfer the data in real time. As such, the user may not be able to view the scene at a data rate that is sufficient to allow real time observations. In some applications, real time data observation is critical. Some prior art systems, such as that disclosed in U.S. Application Publication No. 2005/0141607, include multiple image sensors which cumulatively provide a panoramic view, wherein the images may be decimated to reduce bandwidth for image transmission. However, some surveillance situations, for example military or law enforcement operations, may additionally require a robust device that can withstand the force of an impact.

Additionally, other prior art systems include very wide angle lens which are corrected by image processing operations. In this way a panoramic view may be created.

There is a need in the art, for improved robust image sensor systems that deliver data at real time data rates to a remote location. Further, there is a need for an efficient and inexpensive system that can allow multiple sensors to work together to provide a composite image presenting an enlarged field-of-view.

SUMMARY

The invention addresses the deficiencies of the prior art by providing an improved image sensor system. More particularly, in various aspects, the invention provides a technique for real time image transmission from a remote handheld imaging device having plural fields of view.

In one aspect, the invention provides a handheld imaging device including an outer housing, an inner sensor body, a plurality of image sensors disposed on the surface of the sensor body, each image sensor having a field of view and recording an image in each respective field of view, and one or more images being combined into a scene, wherein the scene has a resolution, and a processor for selectively adjusting the resolution of at least a portion of the scene.

In one implementation, the handheld imaging device also includes a transceiver in connection with the processor, for transmitting image data to a remote location. The transceiver may receive image data from the processor, or from a memory.

According to one feature, the plurality of image sensors are positioned such that their fields of view overlap. The plurality of image sensors may be positioned to capture at least a hemispherical region within the fields of view of the plurality of image sensors. In other embodiments, the plurality of image sensors may be positioned to capture a 360-degree view within the fields of view of the plurality of image sensors.

In one configuration, the device may further include a memory containing a table mapping each of a plurality of image points from the scene to a pixel of at least one image sensor. The device may also include a display-driver, wherein the display-driver references the table to determine which pixel from which image sensor to use to display a selected section of the scene.

In one implementation, the plurality of image sensors record an image at a high resolution. The processor may selectively decrease the resolution of the scene captured by the image sensors. Alternatively, the processor may selectively decrease the resolution of a portion of the scene. The processor may selectively adjust the resolution of the scene or a portion of the scene based on a condition. Some possible conditions include movement in the scene and user selection. In one implementation, the processor decreases the resolution of the portion of the scene that is substantially static, and transmits the changing portion of the scene in a higher resolution. In another implementation, a user selects an area of the scene, and the processor decreases the resolution of the unselected portion of the scene. According to another embodiment, the plurality of image sensors record an image at a low resolution.

According to various configurations, the device further includes an image multiplexer for receiving the images recorded by the image sensors. According to one feature, the image multiplexer merges the images and creates a scene. The device may further include a memory for storing the images received by the image multiplexer.

In one configuration, the device includes a memory for storing the images recorded by the sensors.

According to one feature, the outer housing is robust, such that it remains intact upon impact with a hard surface.

In another aspect, the invention provides an imaging device including an outer housing, an inner sensor body, at least one image sensor disposed on the surface of the inner sensor body, the image sensor having a field of view and recording an image in the field of view, wherein the image has a resolution, and a processor for selectively adjusting the resolution of at least a portion of the image.

According to one implementation, the image sensor records an image at a high resolution. The processor may decrease the resolution of the image, or the processor may decrease the resolution of a portion of the image. According to one configuration, the processor selectively decreases the resolution of a portion of the image that is substantially static. According to another configuration, a user selects an area of the image, and the processor decreases the resolution of the unselected portion of the image. The processor may selectively adjust the resolution to allow for real-time transmission of image data.

According to one implementation, the eye-tracking sensor is used to determine a portion of an image that the viewer is interested. The eye-tracking sensor may track the focus point of a viewer. The processor, which may be coupled to the eye-tracking sensor, selectively adjusts the resolution level of an image depending on the user's focus point. According to one configuration, the processor increases the resolution of the portion of the image corresponding to the viewer's focus point.

BRIEF DESCRIPTION OF THE DRAWINGS

The foregoing and other objects and advantages of the invention will be appreciated more fully from the following further description thereof, with reference to the accompanying drawings wherein;

FIGS. 11A-11C depict various embodiments of the system according to the invention.

DETAILED DESCRIPTION OF THE INVENTION

Figure 1:
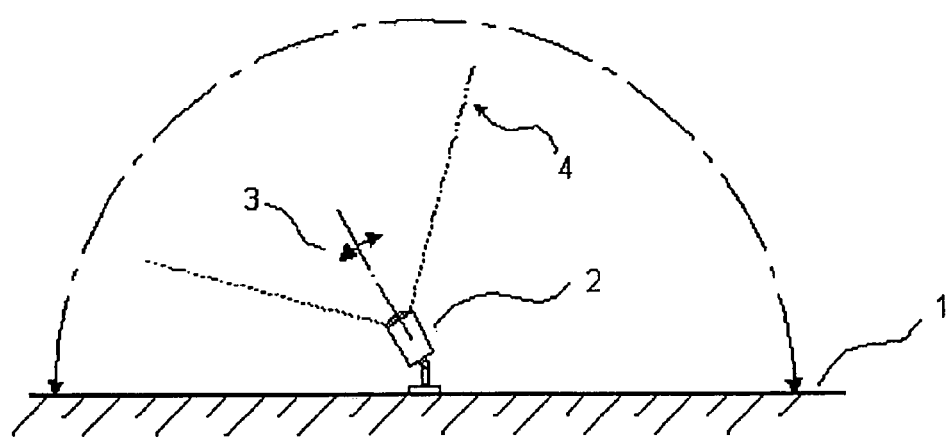
FIGS. 1 and 2 depict a prior art system for providing a panoramic view.
Figure 2:
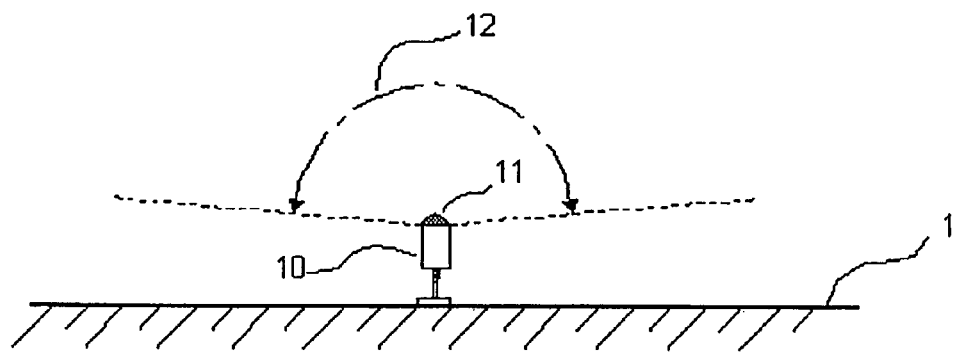
Figure 4:
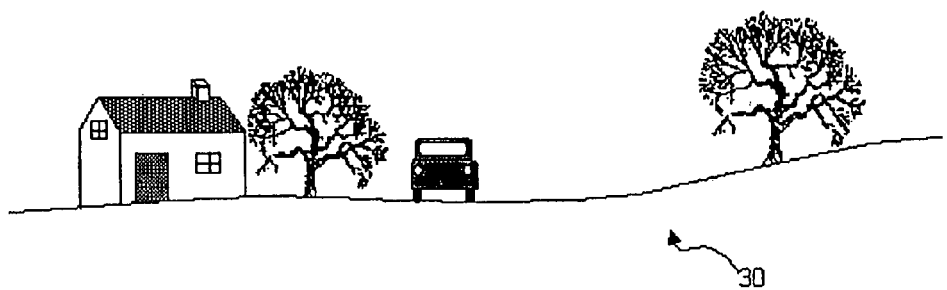
FIG. 4 depicts a graphic scene.

Panoramic views are quite useful and there are numerous existing systems for generating such views. FIGS. 1 and 2 depict a prior art system for providing such a panoramic view. Particularly, FIG. 1 depicts that a sensor 2 capable of collecting an image may be mounted on to a mechanical pivot and moved through an arc 3, 4 to generate a panoramic view of a scene, such as the scene depicted in FIG. 4. FIG. 2 depicts a non-moving sensor including a fisheye lens. A fisheye lens is typically fairly expensive.

Figure 3:
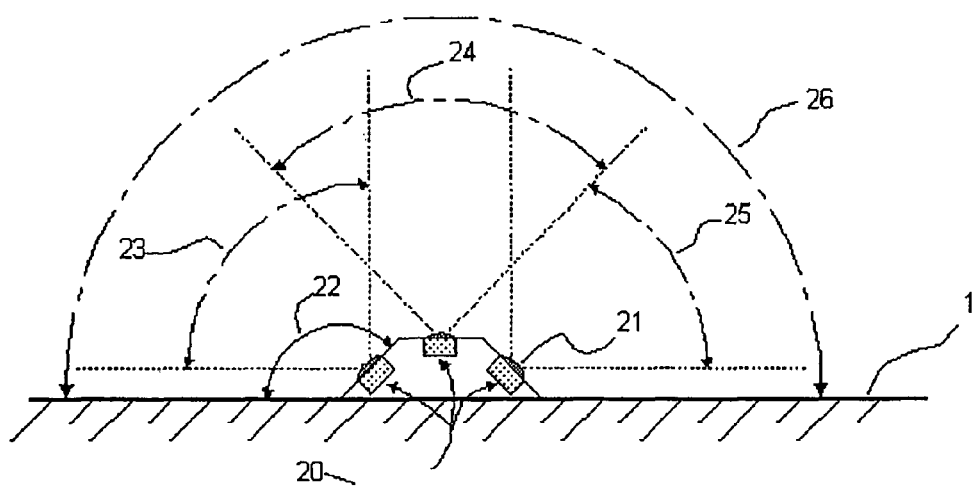
FIG. 3 depicts a first embodiment of the system according to the invention.
Figure 5:
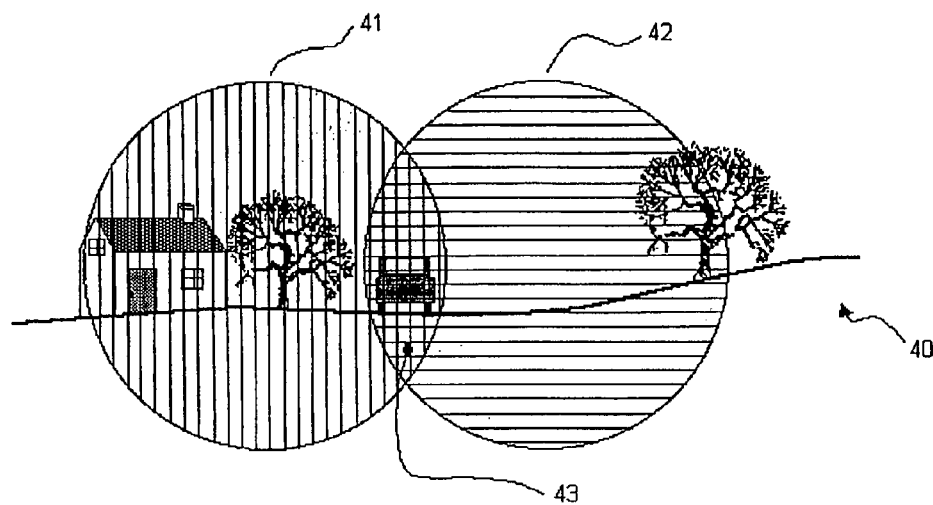
FIG. 5 depicts the graphic scene of FIG. 4 partitioned between two separate fields of view.
Figure 6:
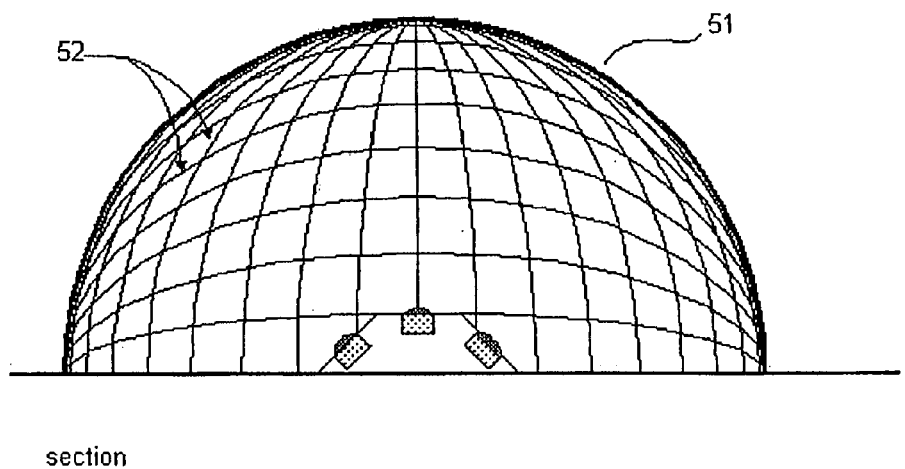
FIGS. 6, 7 & 8 depict a system according to the invention with a grid disposed within the field of view.
Figure 13A:
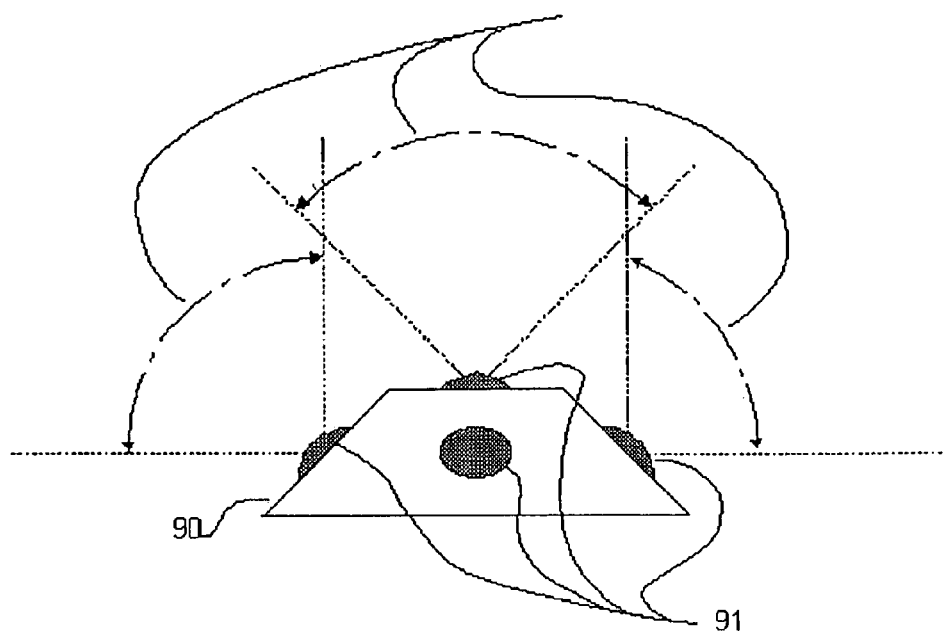
FIGS. 13A and 13B depict a system according to the invention.
Figure 13B:
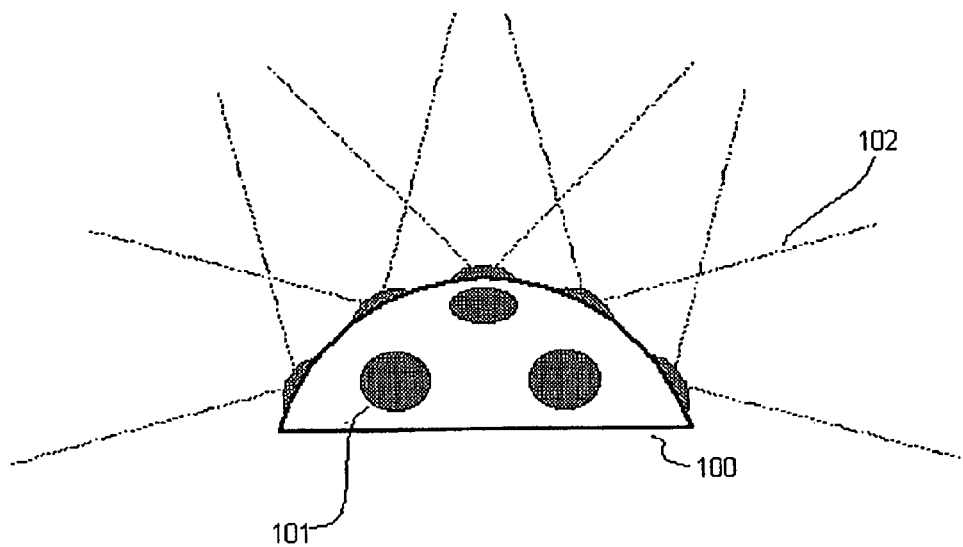

FIG. 3 depicts one embodiment of the systems and methods described herein where a plurality of sensors 21 are statically mounted to a body, where each sensor 21 is directed to a portion of the panoramic scene, as depicted in FIG. 5, and in FIG. 13B. In the depicted embodiment, multiple sensors 21 are mounted on a block so that their individual fields of view 23, 24, 25 overlap and in sum cover a whole hemisphere 26. The block is placed inside a hemispheric dome 51 as depicted in FIG. 6, and in one embodiment a laser beam is played over the inner surface of the dome in such a way that it traces out a grid-like pattern 52. The laser's driver is coordinated with a computer so that when, for example, the laser's spot is directly overhead the sensor block, the computer fills in a lookup table with the information of which pixel of which sensor "sees" the laser spot at that point.

As the laser beam moves around the inside of the dome 51, the lookup table is built up so that for every spot on the dome, the table says which pixels of which sensor "see" it. This lookup table may then be burned into a memory device that resides with the sensor block. In this way, the sensors can be mounted in a low-precision/low-cost manner, and then given a high precision calibration. The calibration method, being software rather than hardware, is low cost.

Note that the laser dot can be made to cover essentially every spot within the dome (given the diameter of the laser dot and enough time), which means that the lookup table may be filled in by direct correlation of every pixel in the dome's interior to one or more pixels in one or more sensors. Alternatively, the laser can be made to trace out a more open grid or other pattern and the correlation's between these grid points can be interpolated by the computer.

When the user wants to view a section of the hemispheric view of the sensors that is (for example) 40.degree. wide by 20.degree. high at a certain azimuth and elevation, this request is input into the computer. The computer calculates where the upper left corner of the rectangle of this view lies in the look-up table. The display-driver then looks up which pixel from which sensor to use as it paints the display screen from left to right and top to bottom.

Figure 14:
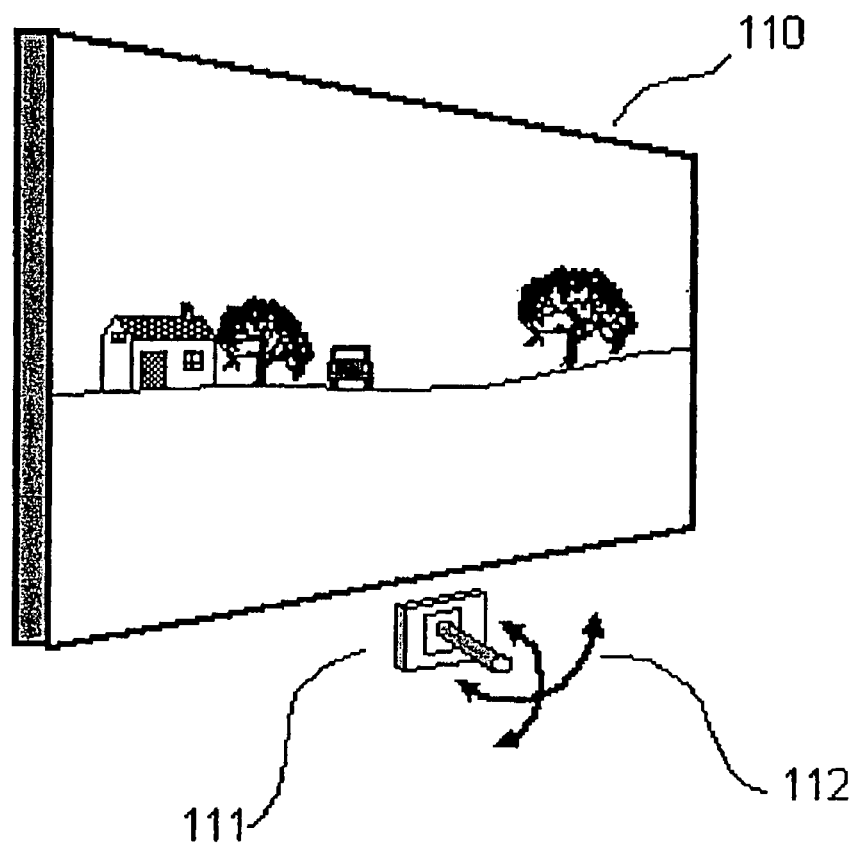
FIG. 14 depicts a user display employing a system according to the invention for depicting a graphic scene, such as the scene depicted in FIG. 4.

As the user moves his field of view around, the display driver shifts the starting point within the lookup table from which to gather the information to paint the display. This is illustrated in FIG. 14 that depicts a user moving through a graphic scene, such as the scene 30 depicted in FIG. 4. According to one feature, the view in the display 110 of FIG. 14 may be moved around using the user control device 111. The user control device 111 may be used to shift the view in the display 110 in any selected direction. In another embodiment, the display 110 may be a touch screen display, and the view may be shifted by touching certain areas of the display. For example, the view may be centered on the area touched by the user.

Figure 9:
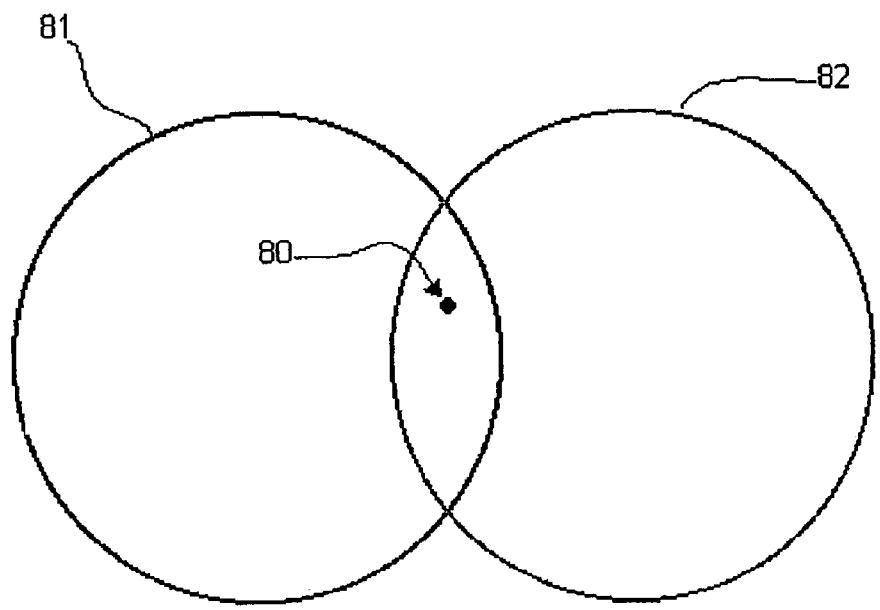
FIG. 9 depicts a location within an image wherein the location is at the intersection of two separate fields of view.

If there are multiple pixels at a certain calibration point (as will happen where the sensors' fields overlap as shown in FIG. 9), then the computer can use a number of different strategies to chose how to write the display. It can:

randomly chose one pixel;

average the values of all the pixels available at that point;

throw out the darkest pixel and display the lighter (if pixels failure mode is off);

use the pixel that has shown the most recent change (another way of detecting broken pixels or pixels whose view has been obscured by dirt on the lens or other kind of damage, i.e., this constitutes a self-healing mechanism); or apply any other suitable technique for selecting or combining the multiple choices.

If the user wants to "zoom in" on the image, the driver can select a narrower and shorter section of the lookup table's grid to display. If the number of pixels in this lookup table section are fewer than the number of pixels that are needed to paint the full width of the screen then the pixels in between can be calculated, as is common in the "digital zoom" of existing cameras or in programs such as Photoshop.

If the user wants to "zoom out" to get a wider field of view, so that the pixels in the lookup table exceed the pixels in the width and height of the screen, then the computer can average the excess pixels to get an average value to be painted at each pixel displayed on the screen.

Sensors of multiple frequency sensitivity (for example visible light sensors and thermal sensors) can be mixed in a layered lookup table. This would allow the user to select between different kinds of vision, or to merge the different pixel values to get a sensor fusion effect (this can have certain advantages in the military environment for target recognition and identification). The sensors can be of any suitable type and may include CCD image sensors. The sensors may generate a file in any format, such as the raw data, GIF, JPEG, TIFF, PBM, PGM, PPM, EPSF, X11 bitmap, Utah Raster Toolkit RLE, PDS/VICAR, Sun Rasterfile, BMP, PCX, PNG, IRIS RGB, XPM, Targa, XWD, possibly PostScript, and PM formats on workstations and terminals running the X11 Window System or any image file suitable for import into the data processing system. Additionally, the system may be employed for generating video images, including digital video images in the .AVI, .MPG formats.

Optionally, the system may comprise a micro-controller embedded into the system. The micro-controller may comprise any of the commercially available micro-controllers including the 8051 and 6811 class controllers. The microcontrollers can execute programs for implementing the image processing functions and the calibration functions, as well as for controlling the individual system, such as image capture operations. Optionally, the micro-controllers can include signal processing functionality for performing the image processing, including image filtering, enhancement and for combining multiple fields of view. These systems can include any of the digital signal processors (DSP) capable of implementing the image processing functions described herein, such as the DSP based on the TMS320 core sold and manufactured by the Texas Instruments Company of Austin, Tex.

Optionally, if it is desired or necessary to reduce the bandwidth between the system's sensor head and display, then the digital storage of the lookup table and an associated processor can be placed in the sensor head, making an "intelligent sensor head." In this way, when the user calls for a certain frame of view within the lookup table's pixels, and the sensor head has to only transmit that specific information, rather than the larger data set that comprises the sensor head's whole field of view. This configuration might be desirable, for example, when using a wireless connection between the sensor head and the display. Besides a wireless connection, the sensor head might alternatively communicate with the display unit by means of a wire, a fiber optic link or via light (for example by means of an Infrared emitter/detector pair).

Also, the system can be configured such that the "intelligent sensor head" will only transmit an image to the system's display if there are certain changes in the pixels in a section of the sensor head's field of view (i.e., movement). In one method the processor that manages lookup table can detect motion, for example, by being programmed to note if a certain number of pixels within the field of view are changing more than a certain set amount while other pixels around these changing pixels are not changing. The "intelligent sensor head" could then select a frame of view such that these changing pixels (the moving object) are centered within the frame and then send that image to the display. Alternatively, the sensor head could select a frame from among a predetermined set of view frames that best contains the changing pixels and send that frame to the display (this may help a user familiar with the set of possible frames more easily identify where within the larger field of view the motion is occurring).

FIGS. 10 through 12G depict in more detail one particular embodiment of an intelligent sensor head, and in particular, depict a sensor head that has sufficient intelligence to provide an image that has multiple sections wherein different sections have different levels of resolution. As will be discussed below, such an intelligent sensor head achieves a type of data compression that allows for a substantial volume of data, which is typical in an imaging application such as this, to be captured and transferred in real time to a remote location.

Figure 10:
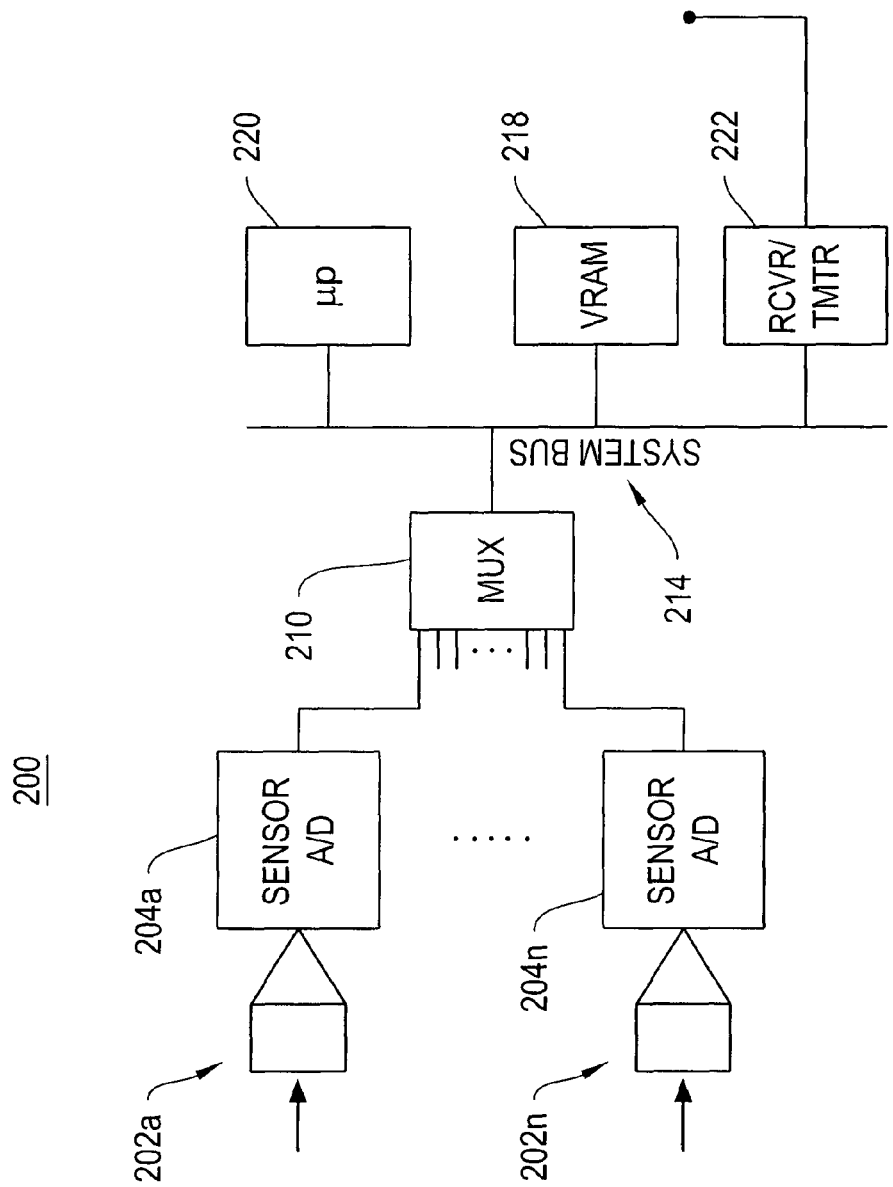
FIG. 10 depicts a functional block diagram that shows different elements of an intelligent sensor head.

Turning to FIG. 10, a functional block diagram 200 is presented that shows different elements of an intelligent sensor head capable of compressing the data by selectively choosing a portion of an image to send as a high resolution image, and sending the remaining portion as a low resolution image. In particular, FIG. 10 shows a plurality of lenses 202a-202n that focus an image onto a sensor array, including sensors 204a-204n. The depicted lenses 202a-202n may be arranged on the exterior surface of a sensor head, similar to the way the lenses appear in FIG. 3. The sensor array may be a CCD array of the type commonly used in the industry for generating a digital signal representative of an image. The CCD can have a digital output that can be fed into the depicted multiplexer 210. The depicted multiplexer 210 receives data signals from a plurality of sensors 204a-204n from a CCD array, wherein each signal received by the multiplexer 210 may comprise a high resolution image that makes up a section of the total image being captured by the device. In an alternative embodiment, the signals sent to the multiplexer 210 may comprise a low resolution image that makes up a section of the total image being captures by the device. This image data may be transferred by the multiplexer 210 across the system bus 214 to a video memory 218 located on the system bus 214 and, in one embodiment, capable of storing a high resolution image of the data captured through the sensors 204a-204n.

In one embodiment, a microprocessor 220 or a digital signal processor can access the data in the video memory 218 and feed the data to the receiver/transmitter 222 to be transmitted to a remote location. The receiver/transmitter 222 may include a transceiver for transmitting the data. In this embodiment, each particular sensor 204*a*-204*n* stores its field-of-view (FOV) data in the video memory 218 in a range of memory addresses that are associated with that respective sensor. In this way, the data stored in the video memory may be associated, at least logically, with a particular sensor and related FOV, and therefore a particular section of the image being captured by the intelligent sensor head. In one operation, the microprocessor 220 accesses the image data stored in the memory 218 and transmits that data through the transmitter 222 to a remote location. The microprocessor 220 can adjust the resolution of the data as it is read from the image memory 218 and may reduce the resolution of each section of the image being transferred except for a selected section that may be transferred at a high resolution.

In one embodiment, the data stored in the image data is 16 bit data associated with a 1,024×1,024 pixel CCD array sensor. In operation, the microprocessor 220 may choose to transfer only a subportion of the 1,024×1,024 range of pixel data and may also choose to do it at a reduced bit size such as 4 bits. The subportion selected to transfer may be chosen by selecting a reduced subset of the data that will give a lower resolution image for the associated FOV. The subportion may be selected by sub-sampling the data stored in the video memory 218 by, for example, taking every fourth pixel value. In this way, a substantial amount of data compression is achieved by having the majority of the image being transferred at a low resolution.

In an alternative embodiment, the microprocessor 220 may have control lines that connect to the sensors 204*a*-204*n*. The control lines can allow the microprocessor 220 to control the resolution of the individual sensor 204*a*-204*n*, or the resolution of the image data generated by the sensor 204*a*-204*n*. In this alternate embodiment, the microprocessor 220 may respond to a control signal sent from the remote user. The receiver/transmitter 222 depicted in FIG. 10 may receive the control signal and it may pass across the system bus 214 to the microprocessor 220. The control signal directs the microprocessor 220 to select the resolutions of the different sensors 204*a*-204*n*, so that one or more of the sensors 204*a*-204*n* generates data at one level of resolution, and others generate data at a different level of resolution.

According to another embodiment, the intelligent sensor head may comprise only one sensor 204*a*. The microprocessor 220 may have control lines that connect to the sensor 204*a*, and the control lines can allow the microprocessor 220 to control the resolution of the sensor 204*a*, or the resolution of the image data generated by the sensor 204*a*. In this alternate embodiment, the microprocessor 220 may respond to a control signal sent from the remote user. According to one feature, the microprocessor 220 may adjust the resolution of a portion of the image data generated by the sensor 204*a*. For example, the sensor 204*a* may be able to record high resolution images, and the microprocessor 220 may decrease the resolution of all but a selected portion of the recorded image. The receiver/transmitter 222 depicted in FIG. 10 may receive the control signal and it may pass across the system bus 214 to the microprocessor 220. The control signal directs the microprocessor 220 to select the resolutions of the different portion of an image recorded by the sensor 204*a*, so that the sensor 204*a* generates one or more portions of the image at one level of resolution, and other portions at a different level of resolution.

In the embodiments described above, the sensor head is discussed as being able to transmit data at a high or a low level of resolution. However, it will be apparent to those of skill in the art, that the resolution level may be varied as required or allowed by the application at hand, and that multiple resolution levels may employed without departing from the scope of the invention. Further, the number of FOVs that are sent at a high level of resolution may be varied as well. These and other variations are all to be understood as encompassed within the embodiment depicted in FIG. 10.

According to one embodiment, the high-resolution image data has a resolution of greater than about 150 pixels per inch. The resolution may be about 150, about 300, about 500, about 750, about 1000, about 1250, about 1500, about 1750, about 2000, or about 2500 pixels per inch. In some embodiments, the low-resolution image data has a resolution of less than about 150 pixels per inch. The resolution may be about 5, about 10, about 20, about 30, about 40, about 50, about 75, about 100, about 125, or about 150 pixels per inch.

According to some embodiments, the image data has a resolution that is sufficient for situational awareness. According to one feature, situational awareness is awareness of the general objects in the image. A viewer may have situational awareness of objects in an image without being able to discern details of those objects. For example, a viewer may be able to determine that an object in the image is a building, without being able to identify the windows of the building, or a viewer may be able to determine that an object is a car, without being able to determine the type of car. According to another example, a viewer may be able to determine that an object is a person, without being able to identify characteristics of the person, such as the person's gender or facial features. Thus, if a viewer has situational awareness of the scene presented in an image, the viewer has a general understanding of what the scene depicts without being able to distinguish details of the scene. Additionally, a viewer having situational awareness of a scene can detect movement of objects in the scene.

According to other embodiments, situational awareness involves perceiving critical factors in the environment or scene. Situational awareness may include the ability to identify, process, and comprehend the critical elements of information about what is happening in the scene, and comprehending what is occurring as the scene changes, or as objects in the scene move.

Data compression may be accomplished using any suitable technique. For example, data generated by a sensor may be resampled via logarithmic mapping tables to reduce the image pixel count. A resampling geometry which is a rotationally symmetric pattern having cells that increase in size and hence decrease in resolution continuously with distance from the center of the image may be used. Spiral sampling techniques may also be used. The sampling pattern may be spread panoramically across the view fields of all three of the sensors, except for the sensor (or sensors) that will provide the high resolution data. The position having the highest resolution may be selected by the operator as described below. Color data compression may also be applied.

FIGS. 11A-11C depict various embodiments of an intelligent sensor head formed as a part of a handheld device 230, 233, or 236 that has a robust outer housing 231, 234, or 237, respectively. The robust outer housing 231, 234, or 237 allows the device 230, 233, or 236 to be tossed by a user so that it lands on the ground or at a remote location. The housing 231, 234, or 237 may be small enough to be handheld, made from plastic such as poly-propolene, or PMMA and will be lightweight. The devices 230, 233, and 236 include a plurality of lenses 232, 235, and 238. The lenses 234, 235, and 238 may be plastic Fresnel lenses, located in apertures formed in the housings 231, 234, and 237. According to alternative embodiments, the lenses 234, 235, and 238 may be any suitable type of lens, including, for example, standard lenses, wide-angle lenses, and fish-eye lenses. The housings 231, 234, and 237 may be robust, such that they may withstand an impact force of about 10,000 Newtons. In various embodiments, the housings 231, 234, and 237 may be designed to withstand an impact force of about 250 N, about 500 N, about 1000 N, about 2500 N, about 5000 N, about 7500 N, about 15000 N, about 25000 N, 50000 N, or about 100000 N. An activation switch may be pressed that directs the device 230, 233, or 236 to begin taking pictures as soon as it lands and becomes stable. In practice, a law enforcement agent or a soldier could toss the sensor device 230, 233, or 236 into a remote location or over a wall. The sensor head may then generate images of the scene within the room or behind the wall and these images may be transferred back to a handheld receiver/display unit carried by the agent or soldier.

More particularly, FIG. 11A shows the device 230, which includes a circular or polygonal head portion and a tabbed portion 239 extending in a plane that is substantially perpendicular to the plane of the head portion. The head portion includes the lenses 232. According to one feature, tabbed portion 239 provides stability to the device 230 after it lands.

FIG. 11B shows the device 233. The device 233 is substantially elliptically-sphere-shaped with tapered edges. According to one feature, the lenses 235 cover a substantial portion of all of the surfaces of the outer housing 234. The device 233 further includes a wiper 229 positioned substantially perpendicular to a top surface of the device 233. According to one feature, the wiper 229 may rotate around the device 233 and clean water or dirt off the lenses 235.

FIG. 11C shows the device 236. The device 236 is a polygonal prism, with a cross-section having ten sides. According to one feature, the width of the device is greater than the height of the device. In other embodiments, the device 236 may have any suitable number of sides, or it may be substantially cylindrical. The device 236 includes lenses 238, which may be located on the lateral sides of the device 236.

Figure 12A:
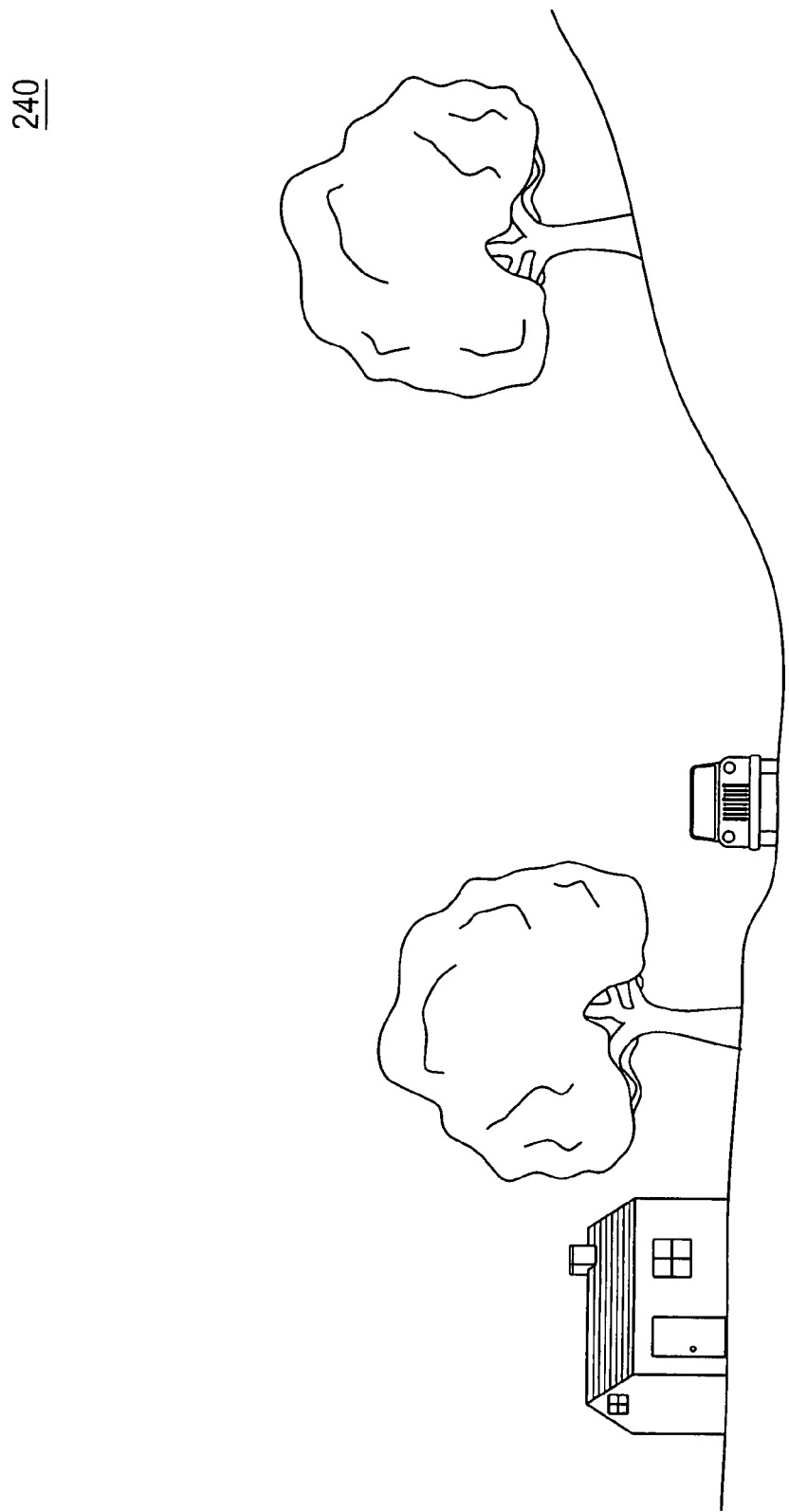
FIGS. 12A-12G depict graphic scenes with various resolutions.
Figure 12B:
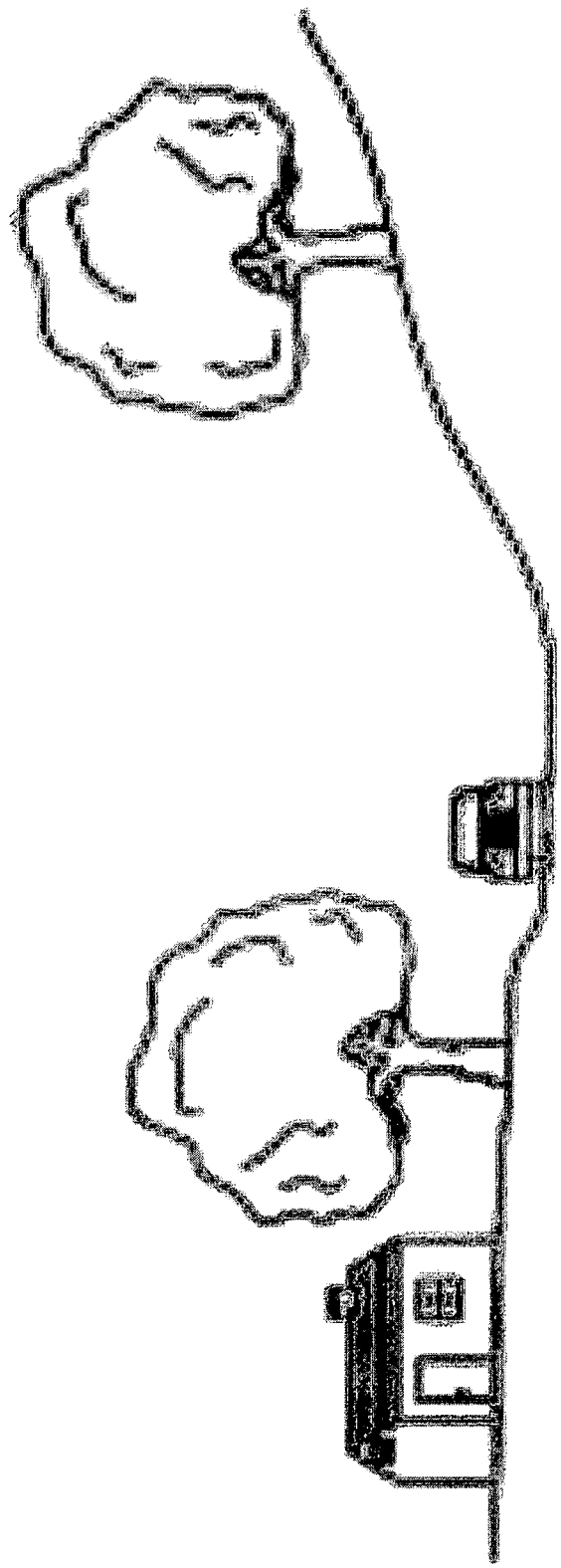
Figure 12C:
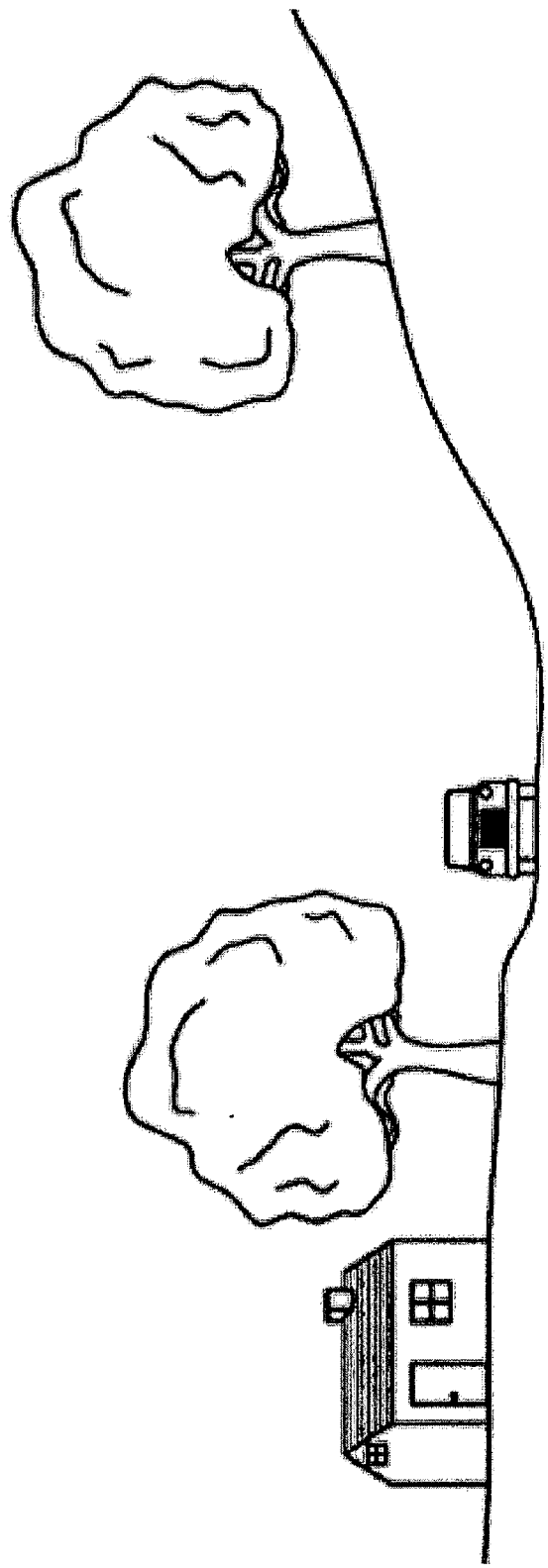

FIG. 12A depicts one example of a high resolution image 240 that may be taken by the any of the systems depicted in FIGS. 11A-11C. The next FIG. 12B depicts a low resolution image 242 of the same scene. This image 242 is blocky as it represents a reduced set of image data being transferred to the user. The image 244 of FIG. 12C depicts the same scene as FIG. 12B, and is derived from the earlier blocky image 242 shown in FIG. 12B by executing a smoothing process that smoothes the image data. According to one embodiment, the blocky, low-resolution image 242 of FIG. 12B is transmitted from the intelligent sensor head to a remote location, and, at the remote location, this image is displayed as a smoothed image 244, shown in FIG. 12C. Both images 242 and 244 contain the same information, but the smoothed image 244 is more readily decipherable by a human user. Moreover, the resolution of the smoothed image 244 is generally sufficient for the human user to be able to understand and identify certain shapes and objects within the scene. Although the image resolution is low and the image 244 lacks detail, the brain tends to fill in the needed detail.

In the human vision system, only a small section (about 5 degrees) in the center of the field of vision (the fovea) is capable of high resolution. Everything outside this section in a viewer's field of view is perceived in a lower resolution. When a viewer's attention is drawn to an object outside the high-resolution fovea, the viewer's eye swivels quickly to focus on the new object of interest, such that the new object lies in the fovea and is perceived at a high resolution and looks sharp.

Additionally, when a viewer "sees" an object, the eye often only transmits enough information for the viewer to recognize the object, and the brain adds in appropriate details from memory. For example, when a viewer sees a face, the brain may "add" eyelashes. In this manner, a smoothed low-resolution image may appear to have more detail than it actually contains, and objects within a smoothed low-resolution image may be easily identified.

Although the smoothing process presents a useful advantage, it is an optional supplemental process, and it is not necessary for the operation of the systems and methods described herein.

Figure 12D:
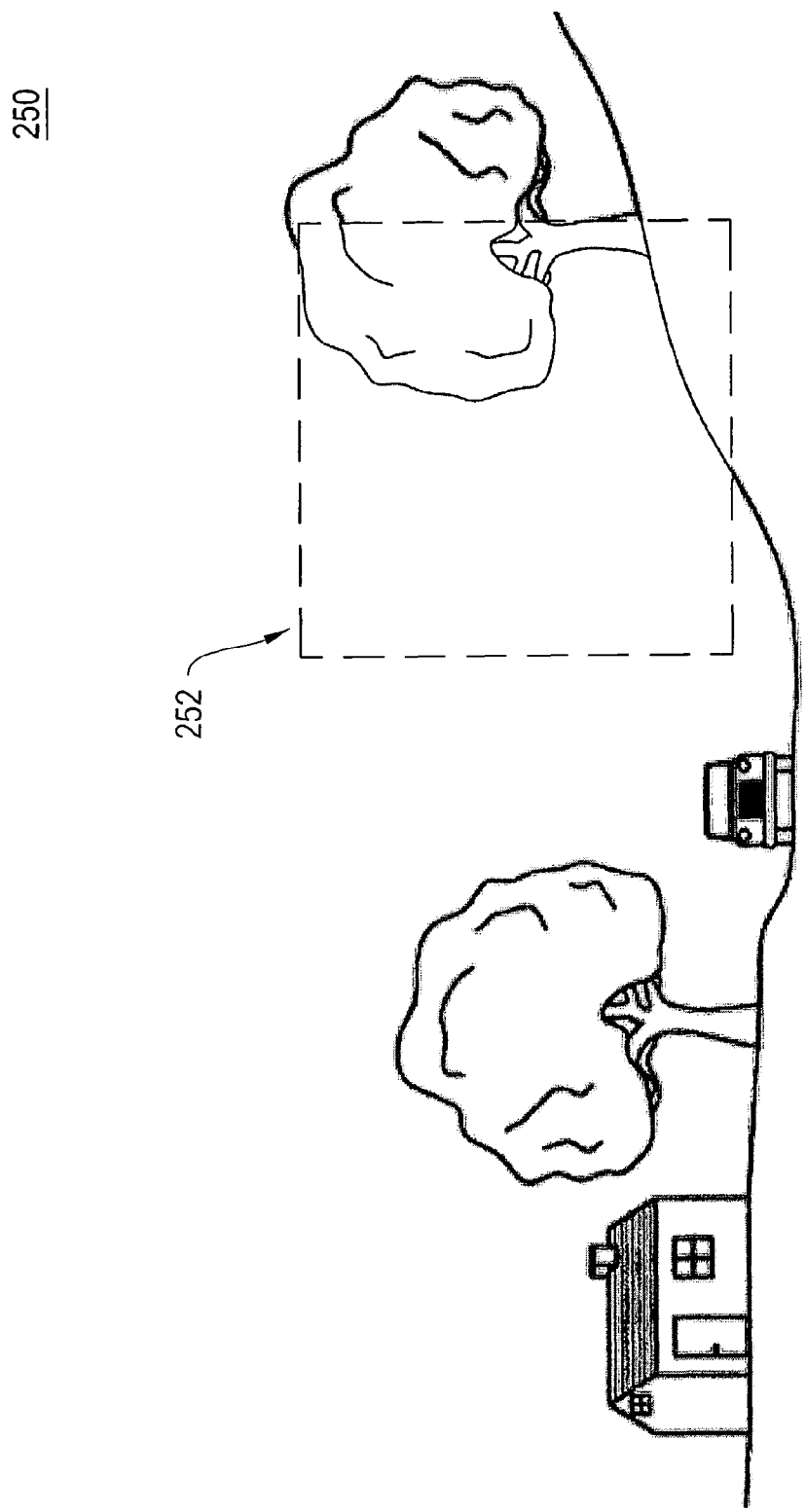
Figure 12E:
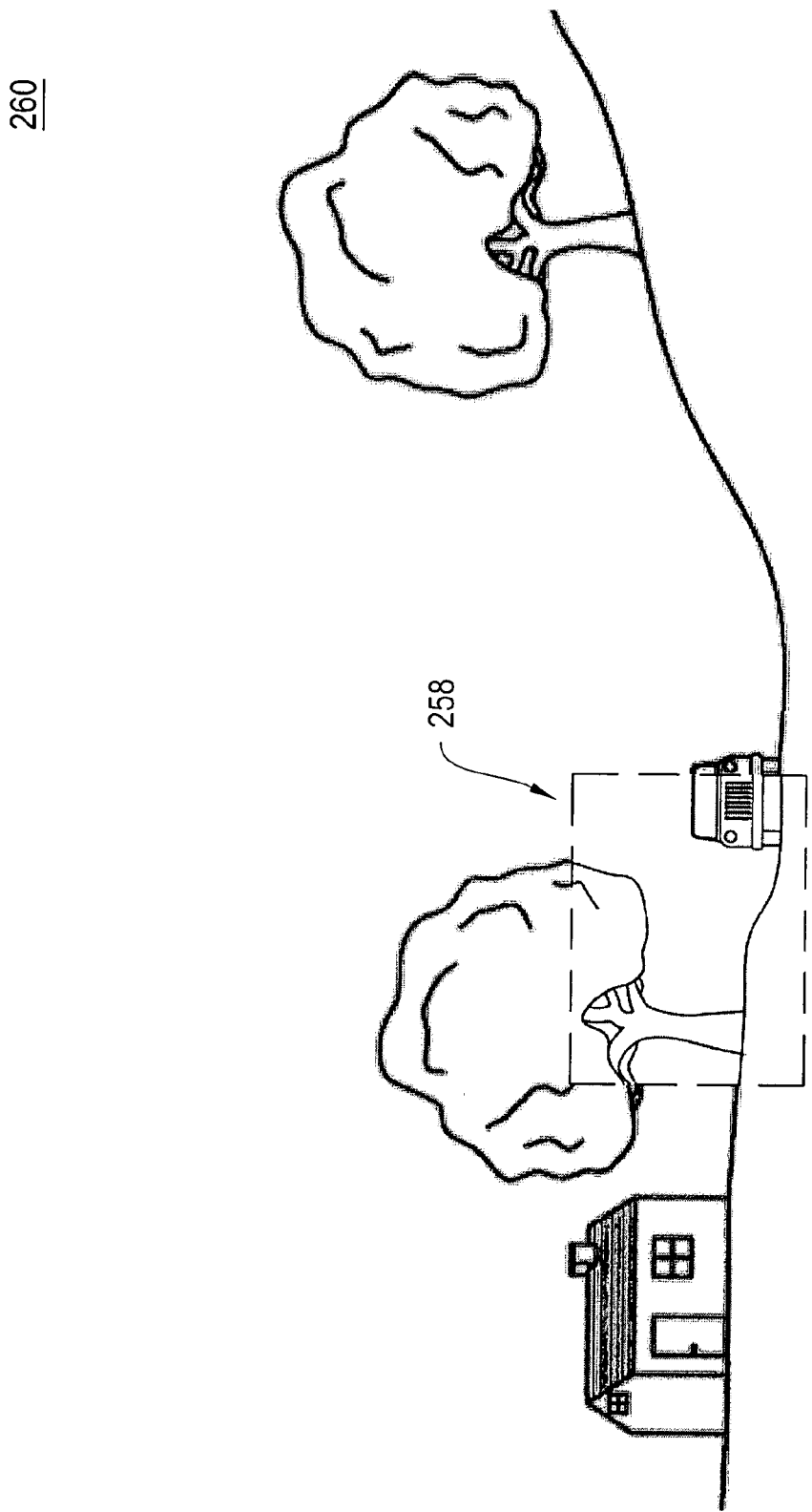

The next figure, FIG. 12D, shows an image 250. Either as part of a temporal sequence, in response to user input, or randomly, the system may begin selecting different sections of the image 250 to transmit in high resolution format. This is depicted in FIG. 12D by the high resolution section 252 of the image 250 that appears on the right-hand side of the scene. The next figure, FIG. 12E, shows an image 260, which illustrates the high resolution section 258 being centered on the car and the adjacent tree. The transmitted image 260 has a relatively low resolution for that portion of the image which is not of interest to the user. However, the sensor array that is capturing the image of the car and the adjacent tree can be identified and the image data generated by that sensor can also be identified and transmitted in a high resolution format to the remote location. This provides the composite image 260 depicted in the figure. Although the high resolution sections 252 and 258 are depicted as being rectangular, in other embodiments, the high resolution sections 252 and 258 may be any selected shape, including circular, elliptical, and polygonal. In one embodiment, the high resolution sections 252 and 258 are rounded, such that the sections 252 and 258 do not include straight lines or corners. Straight lines and corners may be visually distracting to a viewer.

Figure 12F:
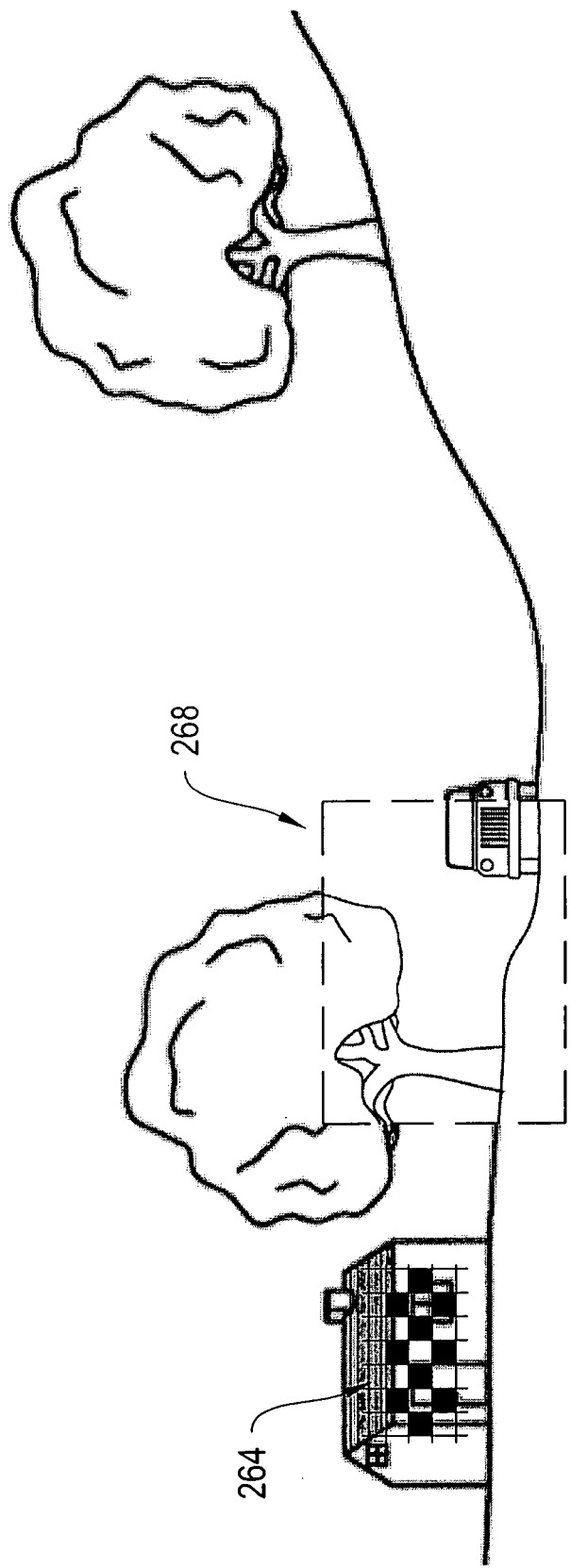

FIG. 12F shows an image 262 with a user control box 264 placed over one section of the scene. In this case, the section is a low resolution section. The user may select a section that the user would like to see in high-resolution. The user then may generate a control signal that directs the intelligent sensor to change the section of the image being presented in a high resolution from the section 268 to the section underlying the user control box 264 that is being selected by the user. According to one embodiment, a user control device similar to the user control device 111 of FIG. 14 may be used to shift the user control box 264.

In another embodiment, the image may be displayed on a touch screen display, and the control box 264 may be moved by the viewer by touching the screen. In one example, when the user touches the screen, the control box 264 moves to the area of the display touched by the user.

In an alternative embodiment, the system detects motion in the scene, and redirects the high-resolution window to the field of view containing the detected motion.

Figure 12G:
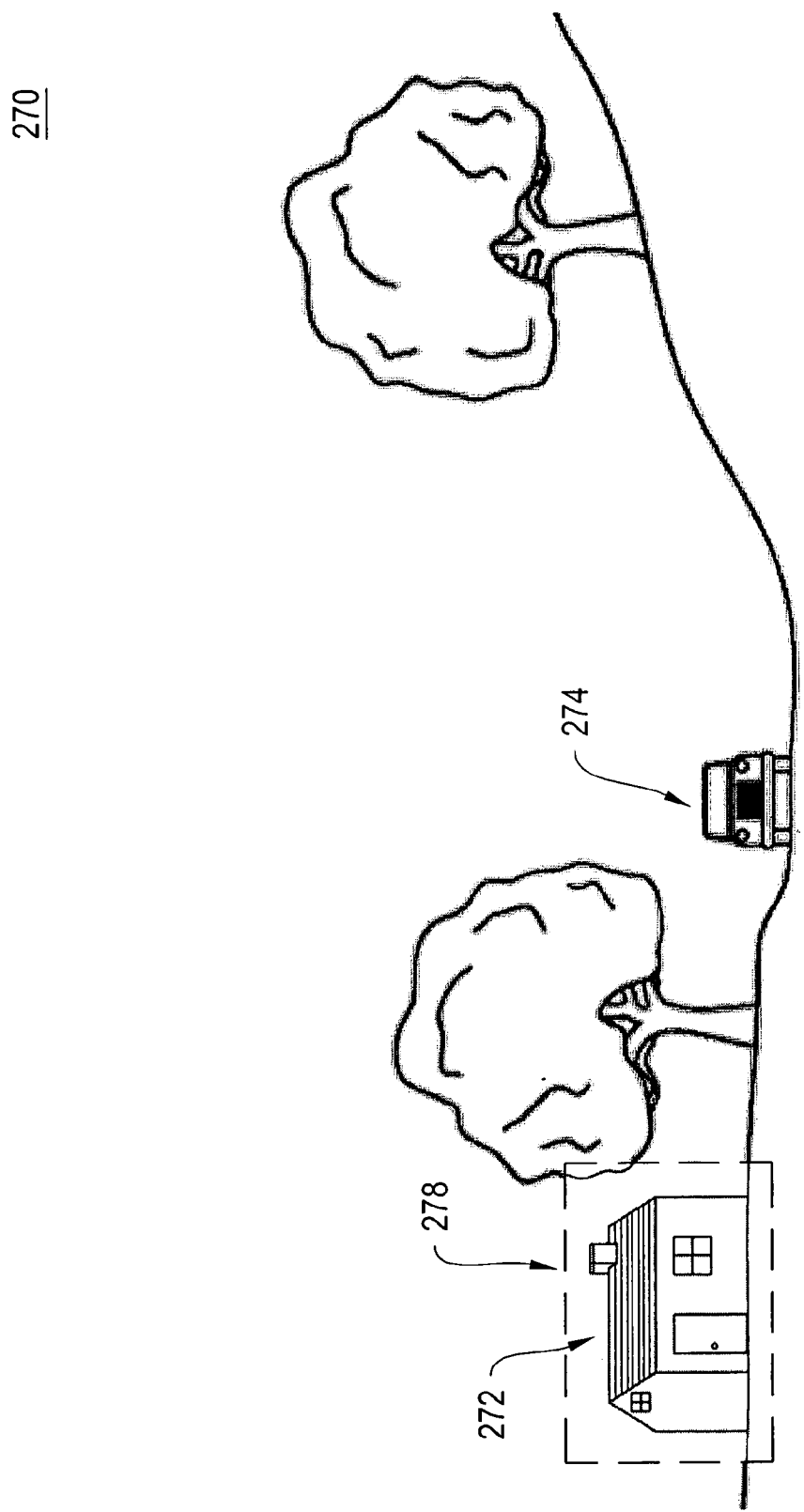

FIG. 12G depicts the new image 270 which shows a house 272, as is now visible in the high resolution section 278. Moreover, this image 270 also shows the earlier depicted vehicle 274. Although this vehicle 274 is now shown in a low resolution format, the earlier use of the high resolution format allowed a user to identify this object as a car, and once identified, the need to actually present this image in a high resolution format is reduced. The viewer's brain, having already previously recognized the vehicle, fills in appropriate details based on past memories of the appearance of the vehicle. Accordingly, the systems and methods described with reference to FIGS. 10 through 12G provide an intelligent sensor head that has the ability to compress data for the purpose of providing high speed image transmission to a remote user.

According to one embodiment, an imaging device may include, among other things, an image sensor, an eye-tracking sensor, and a processor. The image sensor may have a field of view for recording an image. The images may be recorded by the plurality of image sensors to form a panoramic scene. The eye-tracking sensor may track the focus point of a viewer to determine the area that the viewer is interested in. The processor may include a transceiver for transmitting image data to a remote location. In one embodiment, the transceiver may receive the location of the viewer's focus point and transmit the image data associated with the area around the viewer's focus point to a display, which may be located remotely.

Figure 24:
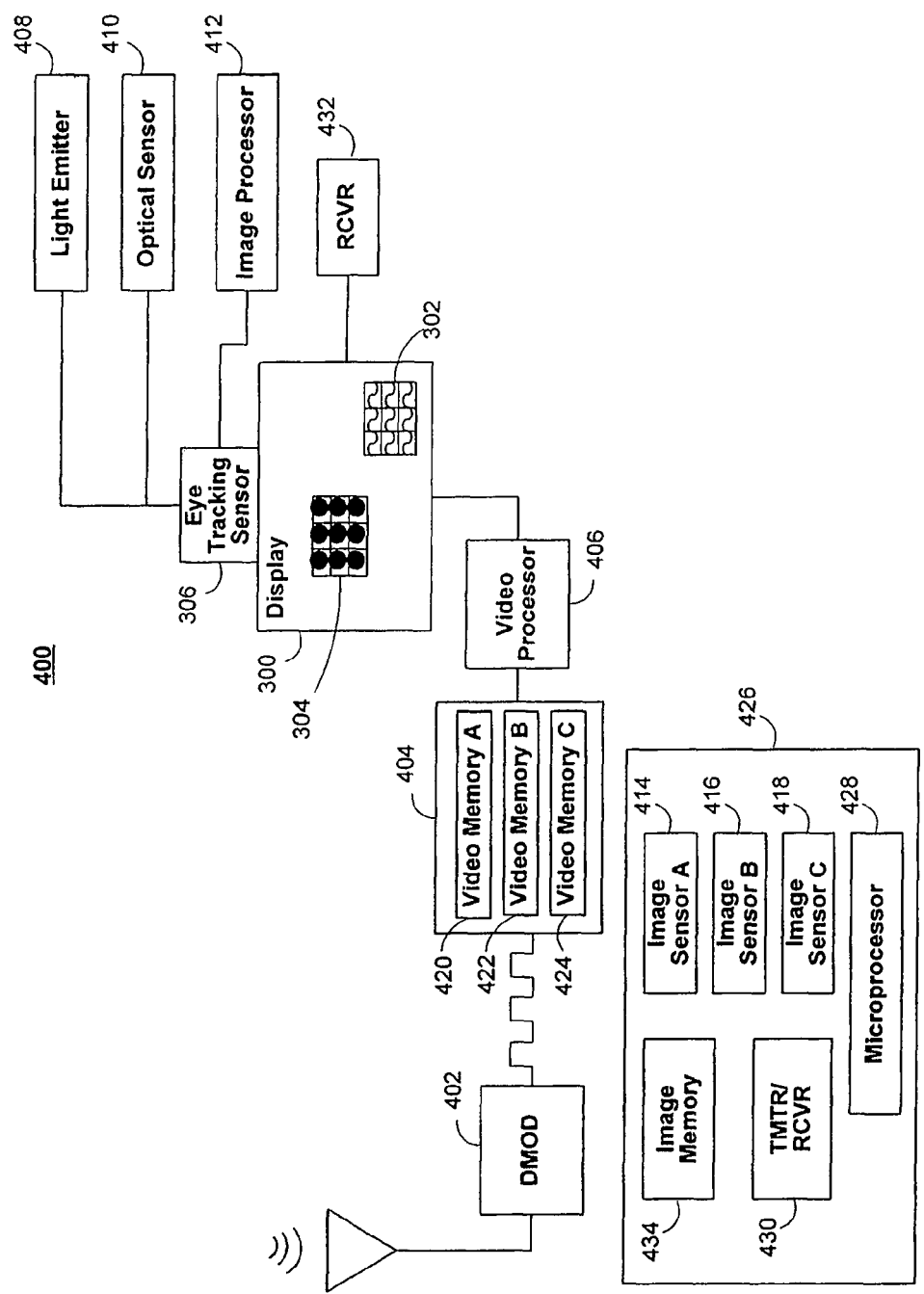
FIG. 24 depicts a functional block diagram that shows different elements of one embodiment of an imaging device.

FIG. 24 depicts in more detail one particular embodiment of an imaging device, and in particular, depict an imaging device that has sufficient intelligence to provide an image that has multiple sections with different levels of resolution.

A functional block diagram 400 is presented that shows different elements of an imaging system capable of displaying an image at a different resolution depending on the viewer's focus point. Although FIG. 24 graphically depicts the microprocessor 428, video processor 406, image processor 412, and the demodulator 402 as functional block elements, it will be apparent to one of ordinary skill in the art that these elements can be realized as computer programs or portions of computer programs that are capable of running on a data processor platform to thereby configure the data processor as a system according to the invention. Moreover, although FIG. 24 depicts the eye-tracking sensor 306 as an integrated unit of a display 300, it will be apparent to those of ordinary skill in the art that this is only one embodiment, and that the invention can be embodied as an imaging devices having multiple displays and eye tracking sensors that are separate from one another. Accordingly, it is not necessary that the video processor 406 be directly coupled to the display 300 or the imaging sensor body 426, and instead the data generated by the image sensor body 426 can be imported into the display 300 by any suitable technique, including wireless data transfer. Thus, the invention can include embodiments, wherein the multiple image sensor bodies 426 are located in remote sites and deliver the data to a processing system such as video processor 406.

FIG. 24 shows the imaging system including an image sensor body 426, a demodulator 402, a video memory 404, a video processor 406, a display 300, and an eye-tracking sensor 306. FIG. 24 shows the imaging device having three image sensor. However, the imaging device may include any number of image sensors as needed for the application. Each image sensor may have lenses that focus an image onto a sensor array. The sensor array may be a CCD array of the type used in the industry for generating digital signal representative of an image. The CCD array may have a digital output that may be fed into a multiplexer (not shown). The image sensor body 426 may include an image memory 434 to store data transferred by the multiplexer. The image memory 434 may be divided into sub-memory to store FOV data from a corresponding image sensor.

In some embodiments, detecting the viewer's focus point may initiate the transmission of the FOV data recorded by the image sensor body 426. FIG. 24 shows the eye-tracking sensor 306 including a light emitter 408, an optical sensor 410, and an image processor 412. The light emitter 408 emits a light beam aimed at the surface of the viewer's eyes. The light is reflected from the viewer's eye and may be sensed by an optical sensor 410. The image processor 412, which may be coupled to the optical sensor 410, may receive the light reflected from the viewer's eyes and use software included in the image processor 412 to calculate the location of the viewer's focus point with respect to the display 300. Such systems are commercially available and can be modified for this application. In one embodiment, an optical sensor 410 focuses on one or both eyes and records their movement as the viewer looks at a stimulus. An optical sensor may include a camera. The optical sensor 410 may use contrast to locate the center of the pupil and use infrared and near-infrared light to create a corneal reflection. The software may take the corneal reflection data and compute the rotation of the eye. The eye-tracking sensor 306 may be wirelessly connected to the image sensor body 426. After the location of the viewer's focus point has been calculated, the image processor 412 may send the location information to the microprocessor 428 of the image sensor body 426 wirelessly, which may begin the process of transferring the stored FOV data to the video processor 406. A video processor may be programmed to generate one or more portions of the image at one level of resolution, and other portions at a different level of resolution. Upon receiving the location of the viewer's focal point, the microprocessor 428 can adjust the resolution of the data as it is read from the image memory 434 to the video memory 404. In this way, the video memory can store the FOV data by the resolution level. For example, FOV data for the area that the viewer's focus point is located may all be stored in video memory 420, whereas the FOV for the rest of the image may be stored in video memory 422. The video processor 406 can access different video memory to transfer the FOV data to the receiver 432 of the display 300. A receiver 432 may turn the received data into visual images. The video processor 406 may be plugged into the display 300 to transfer the data stored in the video memory 404. A viewer in this operation may see on the display 300 an image having a different resolution level; an image on and around the viewer's focus point may be shaper compared to the surrounding images.

In an alternative embodiment, the microprocessor 430 may choose to transfer only a subportion of the data and may also choose to do it at a reduced bit size. In one operation, with the location of the viewer's focus point identified, the microprocessor 428 accesses the FOV data of the image sensors 414, 416, 418 that are stored in the image memory 434. The subportion selected to transfer may be chosen by selecting a reduced subset of the FOV data that will give a lower resolution image in the area that the viewer is not interested in (outside of the viewer's focus point). The subportion of the data, particularly the area outside of the viewer's focus point, may be selected by sub-sampling the FOV data to be stored in the image memory 434 by only storing every fourth pixel value or any other value appropriate for the application. In this way, a substantial amount of data compression is achieved by having a portion of the image being transferred at a low resolution. The transceiver and receiver 430 may transmit the subportion of the FOV data to the video memory 404 to be accessed by the video processor 406.

In alternative operation, upon receiving the location of the viewer's focal point from the image processor 412, the microprocessor 428 selects the resolutions of different image sensors (414, 416, 418), so that the image sensor corresponding to the area focused by the viewer may generate FOV data at a higher level of resolution and remaining sensors may generate FOV data at a lower level of resolution. In this embodiment, the image sensors may store its FOV data in the video memory 404 in memory addresses that are associated with each respective sensor. In other words, the image sensor 414 stores its FOV data in the video memory 420. The image sensor 416 stores its FOV data in video memory 422. The video processor 406 then transfers the FOV data stored in the video memory 404 to the receiver 432 coupled to the display 300. The receiver 432 may turn the received data into visual images. In this embodiment, an area of the display where the viewer is focusing on has a greater number of pixel per inch allowing the viewer to see an image that is closer to the real setting (area 304) compared to the area that the viewer is not focusing on (for example, area 302).

According to one embodiment, the high resolution image data may have a resolution greater than about 150 pixels per inch. The resolution may, for example, range from about 150 to about 2500 pixels per inch or as needed for this application. The low resolution image data may have a resolution of less than about 150 pixels per inch. The resolution may, for example, range from about 5 to 150 pixels per inch or as needed for the application. As an example, for a medial use, when a doctor views an image of a vascular system or any other system having equivalent complexity, the resolution of the image may be significantly higher.

In one embodiment, the display 300 displays the image sent by the video processor 406. In such case, the display 300 simply receives data from the receiver 432 and displays the image as it is received. In another embodiment, the image processor 412 of the eye-tracking sensor 306 may set an area having a boundary and a fixed size. The image processor 412 may be programmed to control this area ("high resolution section"). The high resolution section, shown in FIG. 21B, may follow the viewer's focus point and display the image having a high resolution level within the boundary. In some embodiment, the image processor 412 calculates the location of the viewer's focus point by receiving the corneal reflection from the viewer's eyes. The image processor 412 then sends the location of the viewer's focus point and the specification of the high resolution section area such as width and height of the boundary to the microprocessor 428 of the image sensor body 426. The microprocessor 428 may transmit the FOV data corresponding to the area contained in the specified high resolutions section area at a high resolution level to the receiver 432.

In other embodiments, microprocessor 428 may transmit FOV data from the image sensors 414, 416, 418 to the respective video memories 420, 422, 424 and the video processor 406 may access the data stored in video memory 404 and adjust the resolution of the FOV data to increase the resolution of the data that are specific to the high resolution section defined by the image processor 412. The video processor 406 may then transmit the adjusted FOV data to the receiver 432 of the display 300. In other embodiments, the video processor 406 may decrease the resolution of the FOV data corresponding to the area that is outside of the high resolution section ("low resolution section") and may only transfer a subportion of the FOV data to the receiver 432. Display 300 in FIG. 24 shows an example of a high resolution section and a low resolution section. The high resolution section 304 has more pixels per given area compared to the low resolution section 302. An image shown in the high resolution section 304 is sharper than the image shown in the low resolution section 302. The high resolution section may contain 2400 pixels per inch, where the low resolution section may contain 100 pixels per inch. In some embodiments, the high resolution may range from about 150 to about 2500 pixels per inch. The low resolution may range from about 5 to 150 pixels per inch. Depending on the application, the low resolution may be greater than 150 pixels per inch and the high resolution range may be lower than 150 pixels per inch.

Figure 19:
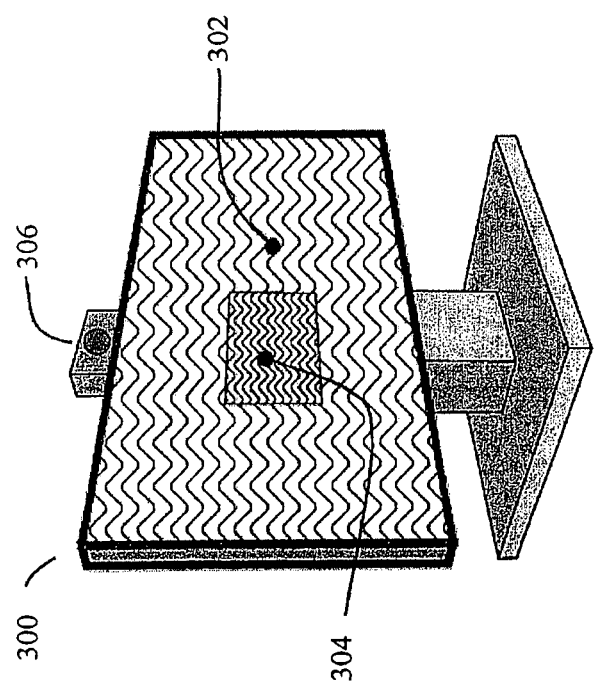
FIG. 19 depicts a display with an eye tracking sensor, showing an image divided into high resolution and low resolution sections.
Figure 20A:
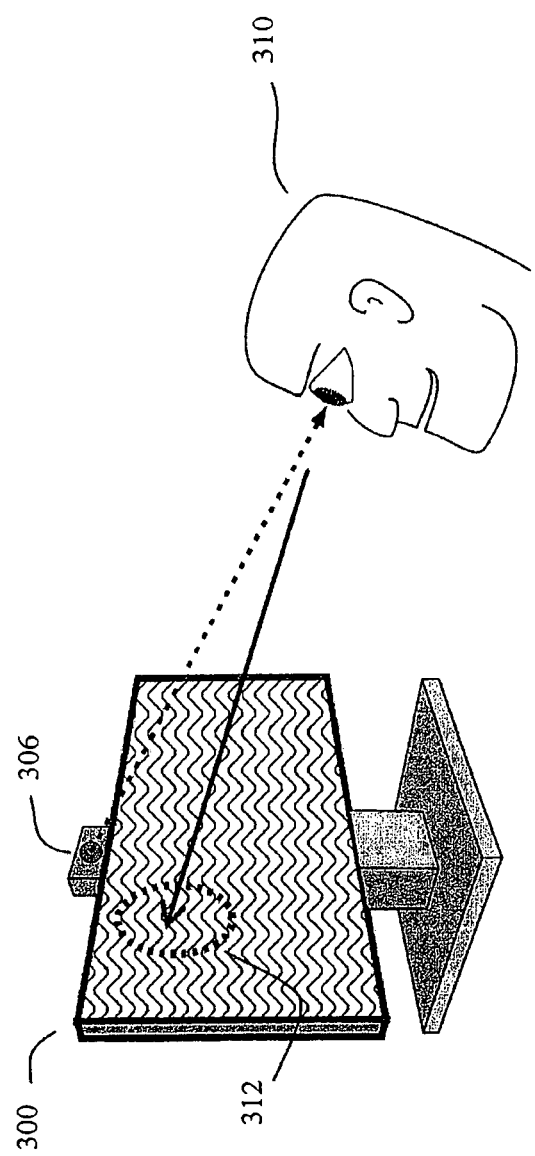
FIG. 20A depicts a viewer regarding one area of the display while an eye tracking sensor determines where the viewer is looking.
Figure 20B:
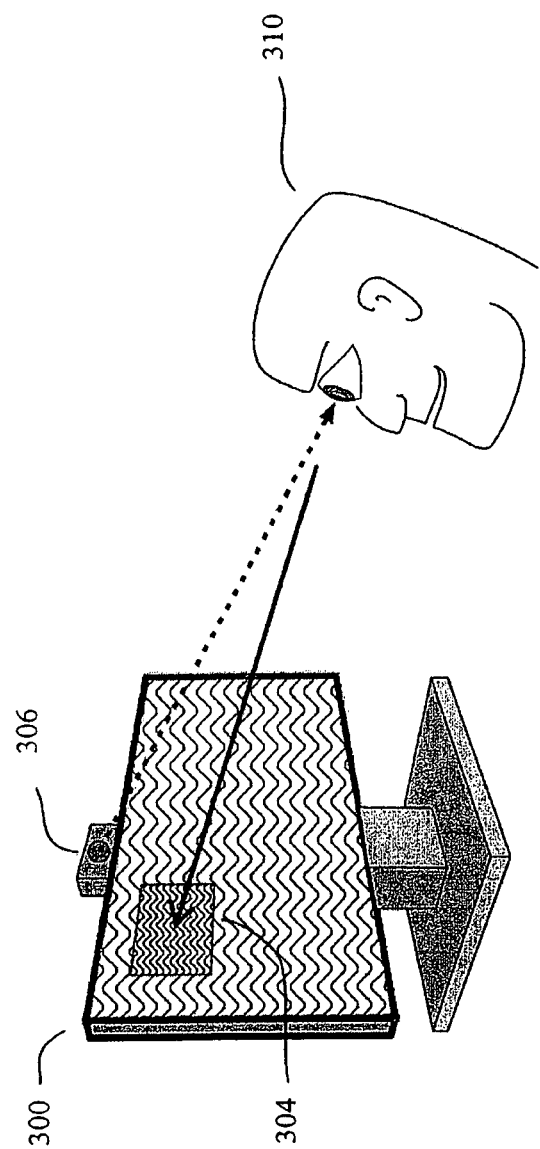
FIG. 20B depicts the display with a high resolution section positioned at the viewer's focus point.

In other embodiments, the image recorded by the image sensors may be displayed on a display. The display may include a high resolution section and a low resolution section and may display a portion of an image in the field of view as a function of the viewer's focus point. For example, FIG. 19 depicts a display 300 with an eye tracking sensor 306. The display includes a high resolution section 304 and a low resolution section 302. The shape of the high resolution section 304 may be a circle, ellipse, a square, a rectangle, or any shape desired by the viewer. The eye tracking sensor 306 is mounted on the display 300 and determines which area of the display a viewer is looking at. The eye-tracking sensor 306 detects a viewer's eye movements and tracks the viewer's focus point on the display 300. FIG. 20A depicts a viewer 310 regarding one area 312 of the display 300 while an eye tracking sensor 306 determines where the viewer is looking by sensing the viewer's focus point. In FIG. 20B, the area around the viewer's focus point is displayed in the high resolution window 304. The eye tracking sensor 306 transmits a the location of the viewer's focus point to the image sensor (not shown), the processor coupled to the image sensor then transmits the image data, selectively adjusted as a function of the viewer's focus point, to the display.

Figure 21A:
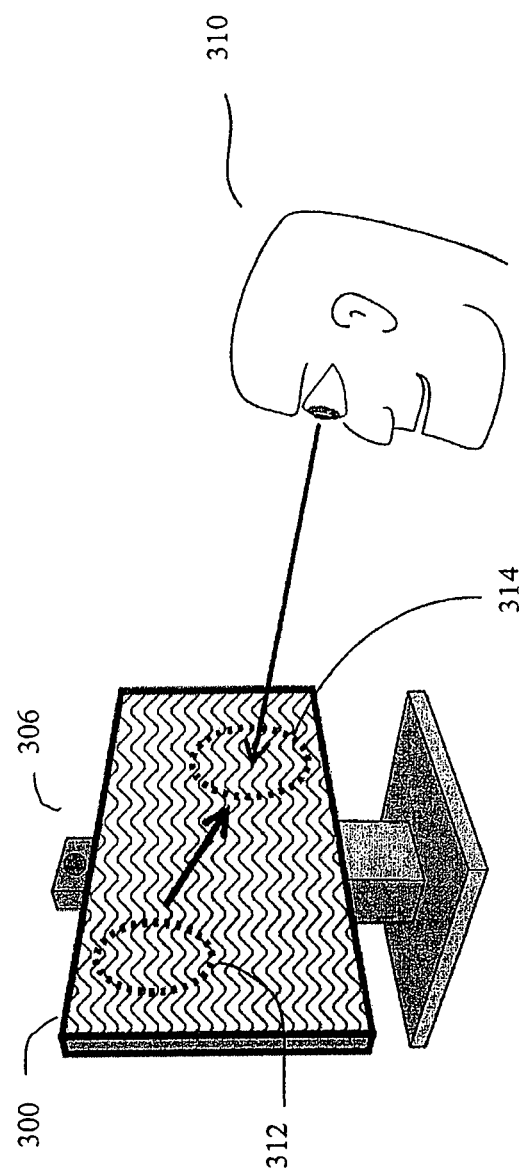
FIG. 21A depicts a viewer moving his focus point from one part of the display to another part.
Figure 21B:
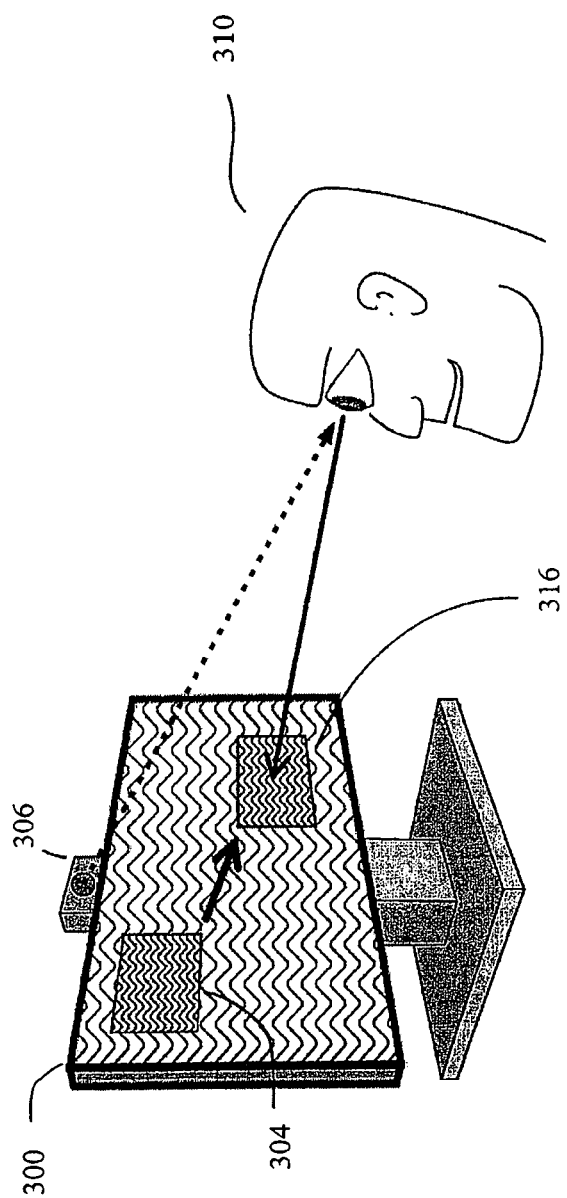
FIG. 21B depicts the display moving the high resolution area to lie under the viewer's new focus point.

FIG. 21A depicts the viewer 310 moving his focus point from the first area 312 of the display 300 to a second area 314 of the display 300. As shown in FIG. 21B, the eye tracking sensor 306 detects the change in the viewer's 310 focus point and the high resolution section 304 follows the viewer's focus point accordingly. The new high resolution section 316 corresponds to the viewer's 310 new focus point. In one embodiment, the eye-tracking sensor 306 detects the change in the viewer's focus point and the new location of the viewer's focus point is sent to the microprocessor 428, which may adjust the resolution of the FOV data for the new location of the viewer's focus point and transmit the data to the receiver 432 of the display 300.

In one example, this system may be used by pilots, such as Air Force pilots. The pilot views a large image of a particular scene, which is rapidly and frequently updated and is therefore transmitted in low-resolution, with the exception of a small high-resolution window. The high-resolution window may be moved based on the pilot's eye focus point.

Figure 22:
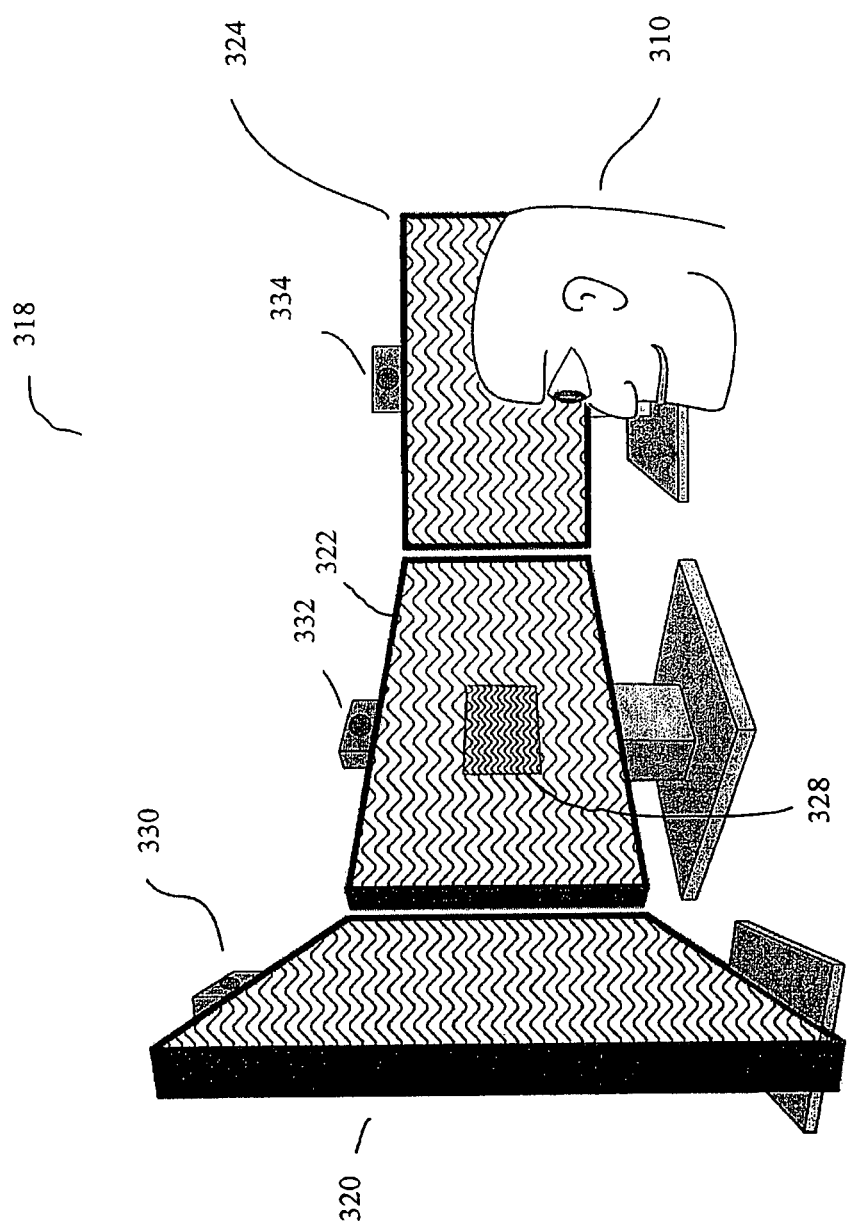
FIG. 22 depicts a panoramic arrangement including multiple displays.

According to other embodiments, the imaging device may include multiple displays with corresponding eye tracking sensors. For example, FIG. 22 depicts a panoramic display 318 including an array of monitors 320, 322, and 324, with corresponding eye tracking sensors 330, 332, and 334. The image transmitted from the image sensor may be displayed panoramically across the array of monitors 320, 322, and 324. The high resolution window 328 is currently located in the center monitor 322, but may move to the other monitors 320 and 324 depending on the viewer's 310 focus point. The method described earlier on tracking the corneal reflection of the viewer's eyes to calculate the location of the viewer's focus point may apply to the imaging device having multiple displays and eye-tracking sensors. The image processor 412 of individual eye-tracking sensor 306 may be in communication with one another to turn on or activate the eye-tracking sensor while the viewer is looking at the respective corresponding monitor. In one embodiment, the respective eye tracking sensors 330, 332, and 334 track the viewer's 310 focus point while the viewer 310 is looking at the respective corresponding monitors 320, 322, and 324.

In another embodiment, the eye tracking sensors 330, 332, and 334 continue to track the viewer's eye movements even while the viewer is looking at other, non-corresponding monitors. The image processors 412 may use software component to track a viewer's focus point while the viewer is looking at non-corresponding monitors. The software component may control the separate image processors 412 of each eye-tracking sensors to behave as one unit. In alternative embodiment, a viewer may wear, for example as an eyeglasses or on the viewer's head, an eye tracking sensor which uses an off-axis infrared light emitter and a small camera to capture a dark-pupil image of the eye. A second camera may be located near the eye to capture the scene from the viewer's perspective. Software component included in the eye-tracking sensor may use the video data of the eye movement and the scene to calculate and track the viewer's focus point.

In other embodiments, the imaging device may be head mountable. The head mountable imaging device may include an image sensor, a display screen, an eye tracker, and a processor. For example, a plurality of image sensors may record and form a panoramic scene. The eye tracker located on the head mountable imaging device may detect the shift in the focus of the viewer's eye and send the new location of the viewer's focus point to a processor. The processor, which may be coupled to the image sensor, may transmit the image around the viewer's focus point at a higher resolution compared to the area that is outside the viewer's focus point to reduce the amount of bandwidth required to transmit the image. A receiver may be coupled to the display to receive and display the image accordingly on the display screen.

In various embodiments, the panoramic display 318 may include any number of monitors, including, for example, two, four, five, six, eight, ten, twelve, fifteen, twenty, and more than twenty monitors. The monitors may be arranged in any positions, including above and below one another, and may also be arranged in any positions with respect to the viewer 310. For example, in some embodiments, the panoramic display 318 includes overhead monitors, and monitors that are positioned substantially to the side of or behind the viewer 310.

In some embodiments, the display may show the images recorded by the image sensors in color. The image sensors may use red, green, and blue filters to separate out the red, green, and blue components of the light reflected by an object. In some embodiments, three separate image sensors may be used, each having its own filter. Each pixel on the sensor may record each color in the image and the three files may be merged to form a full-color image. Also, filters can be placed over individual photosites to capture one of the three colors. In other embodiments, images recorded in gray scale may be converted to colored images by running an imaging processing application on the microprocessor 428 of the image sensor body 426.

Figure 23:
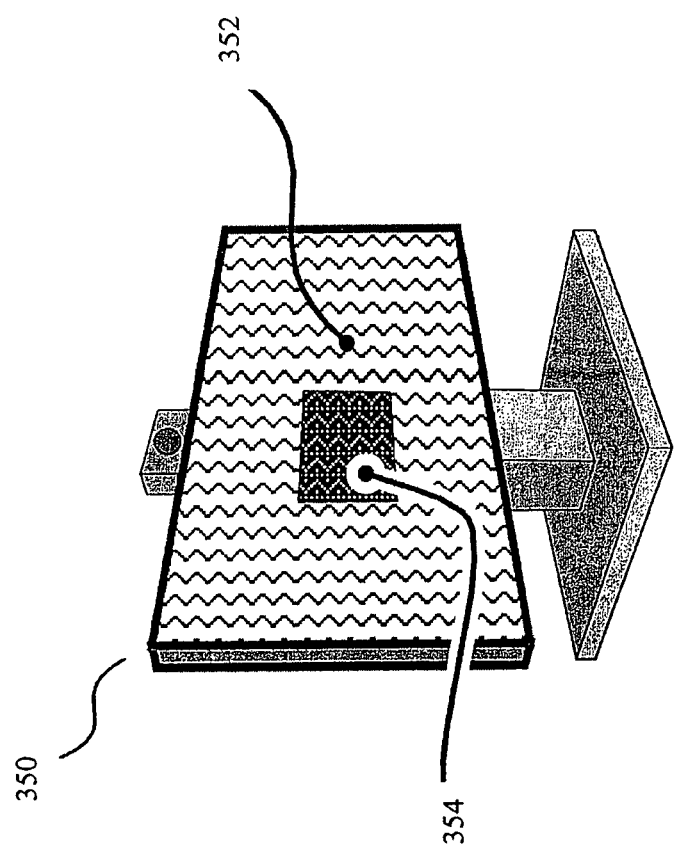
FIG. 23 depicts a monitor displaying a full color palette section within an image displaying a smaller color palette.

FIG. 23 depicts a display 350 displaying a portion of an image in a full color section 354 within a surrounding section 352 having a reduced color. In this embodiment, the color information transmitted from the image sensor is reduced, reducing the amount of bandwidth required to transmit the image. In one implementation, full color information is transmitted only for the full color palette section 354. The full color section 354 may correspond with a viewer's focus point on the display 350.

Because viewers do not have full color receptors outside their fovea, reducing the color information outside their fovea does not degrade their perception of the image, especially in the embodiment in which the full color section corresponds with the viewer's focus point. In one embodiment, the image sensor may transmit a low bandwidth image that includes reduced resolution and reduced color information. In this embodiment, a full color section may correspond with, or substantially overlap, a high-resolution section within the full image. The full color section and the high resolution section may be different in size and/or shape. For example, the full color section may be located within a larger high resolution section, or a high resolution section may be located within a larger full color section. While the full color section 354 is rectangular, in other embodiments, the full color section may be any shape, including, for example, circular, elliptical, and polygonal.

Although the intelligent sensor head device, such as devices 230, 233, and 236 shown in FIGS. 11A-11C, may be thrown like a grenade, in another embodiment, the device may have a clamp or other attachment mechanism, and a group of soldiers operating in a hostile urban environment could mount the sensor head on the corner of a building at an intersection they have just passed through. If the intelligent sensor head detects motion in its field of view, it can send the image from a frame within that field of view to the soldiers, with the object which is moving centered within it. For example, if an enemy tank were to come down the road behind the soldiers, the device would send an image of the scene including the tank, alerting the soldiers of the approaching enemy. Such a sensor would make it unnecessary to leave soldiers behind to watch the intersection and the sensor head would be harder for the enemy to detect than a soldier.

In another example in accordance with the invention, a group of soldiers temporarily in a fixed location could set a group of intelligent sensor heads around their position to help guard their perimeter. If one of the sensor heads detected motion in its field of view, it would send an image from a frame within that field of view to the soldiers with the moving object centered within it. According to one embodiment, the display alerts the soldiers of a new incoming image or images. If there were objects moving in multiple locations, the sensor heads could display their images sequentially in the display, tile the images, or employ another suitable method for displaying the plurality of images. Optionally, the user may have a handheld remote for controlling the device by wireless controller. A display in the remote may display the data captured and transmitted by the device. The handheld remote may include a digital signal processor for performing image processing functions, such as orienting the image on the display. For example, if the scene data is captured at an angle, such as upside down, the digital signal processor may rotate the image. It may provide a digital zoom effect as well. It will be recognized by those of skill in the art, that although the device may employ low cost, relatively low resolution sensors, the overall pixel count for the device may be quite high given that there are multiple sensors. As such, the zoom effect may allow for significant close up viewing, as the system may digitally zoom on the data captured by a sensor that is dedicated to one FOV within the scene.

In another example in accordance with the invention, the sensor head may be configured such that it may be glued to a wall of a building. Alternatively, the sensor head may be configured so that it may be thrown to the location where the user wishes it to transmit from. So that correct up/down orientation of the image is achieved at the display unit in a way that does not require the user to be precise in the mounting or placement of the sensor head, the sensor head may include a gravity direction sensor that the processor may use to in determining the correct image orientation to send to the display.

Figure 7:
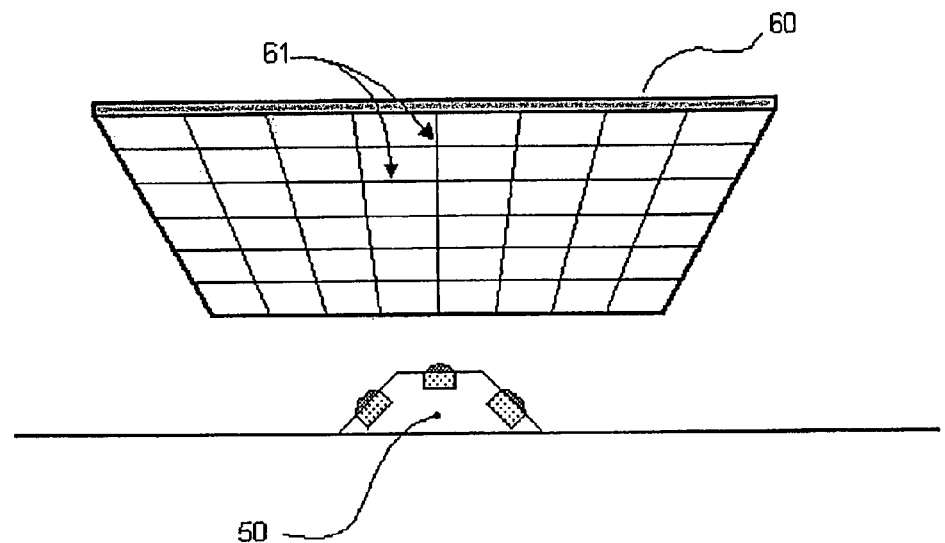
Figure 8:
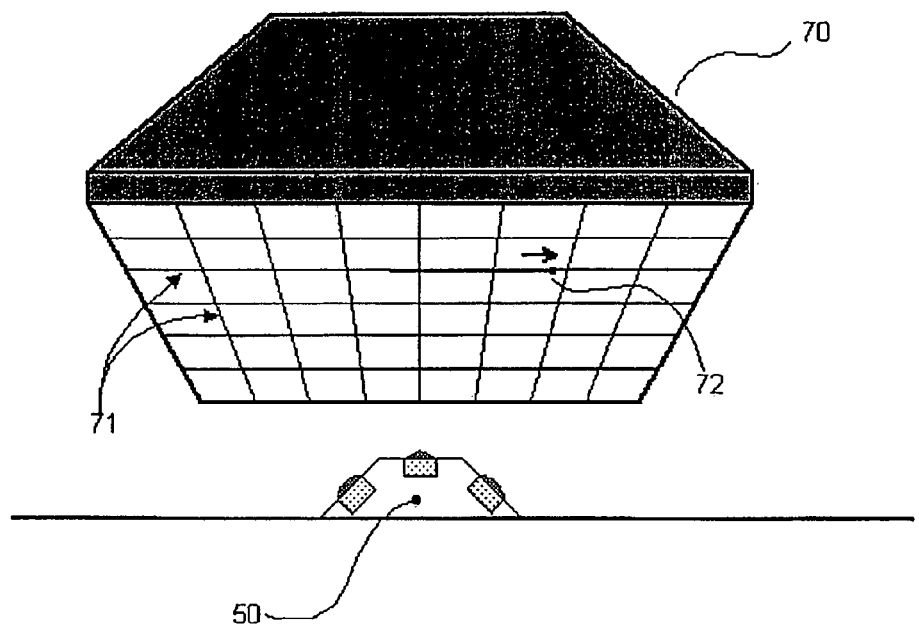

The systems and methods described herein are merely presented as examples of the invention and numerous modifications and additions may be made. For example, the sensors do not need to be on one block, but might be placed around the surface of a vehicle or down the sides of a tunnel or pipe. The more the sensors' fields of view overlap, the more redundancy is built into the system. The calibrating grid may also be a fixed pattern of lights, an LCD or a CRT screen, as depicted in FIGS. 7 and 8. The sensor block may cover more or less than a hemisphere of the environment.

This method allows for non-precision, and thus lower-cost manufacture of the sensor head and a post-manufacturing software calibration of the whole sensor head instead of a precise mechanical calibration for each sensor. If there is to be some relative accuracy in the mounting of each sensor head, then a generic calibration could be burned into the lookup table for the units. This might have applications in situations such as mounting sensors around vehicles so that each individual vehicle does not have to be transported to a calibration facility. It will be understood that compared to a wide-angle lens, the light rays used by multiple 30 sensors that have narrower fields of view are more parallel to the optical axis than light at the edges of a wide-angle len's field of view. Normal rays are easier to focus and thus can get higher resolution with lower cost.

The techniques described herein can be used for pipe (metal or digestive) inspection. If the whole body of the probe "sees," then you do not need to build in a panning/tilting mechanism. In other embodiments, the device could have sensors mounted around the surface of a large, light ball. With an included gravity (up, down) sensor to orient the device, you could make a traveler that could be bounced across a terrain in the wind and send back video of a 360 degree view. In one practice of manufacturing the systems described herein, the sensors are put in cast Lexan (pressure resistant) and positioned on a deep submersible explorer. For this device, you do not need a heavy, expensive, large and water tight dome for the camera. These inexpensive devices may be used in many applications, such as security and military applications. In one example, a unit may be placed on top of a sub's sail. This may have prevented the recent collision off of Pearl Harbor when a Japanese boat was sunk during a submarine crash surfacing test.

The systems described herein include manufacturing systems that comprise a hemi-spherical dome sized to accommodate a device having a plurality of sensors mounted thereon. As shown in FIG. 13A, a laser, or other light source, may be included that traces a point of light across the interior of the dome. Alternatively, other methods for providing a calibrating grid may be provided including employing a fixed pattern of lights, as well as an LCD or a CRT screen. In any case, a computer coupled to the multiple sensors and to the laser driver determines the location of the point of light and selects a pixel or group of pixels for a sensor, to associate with that location.

Figure 15:
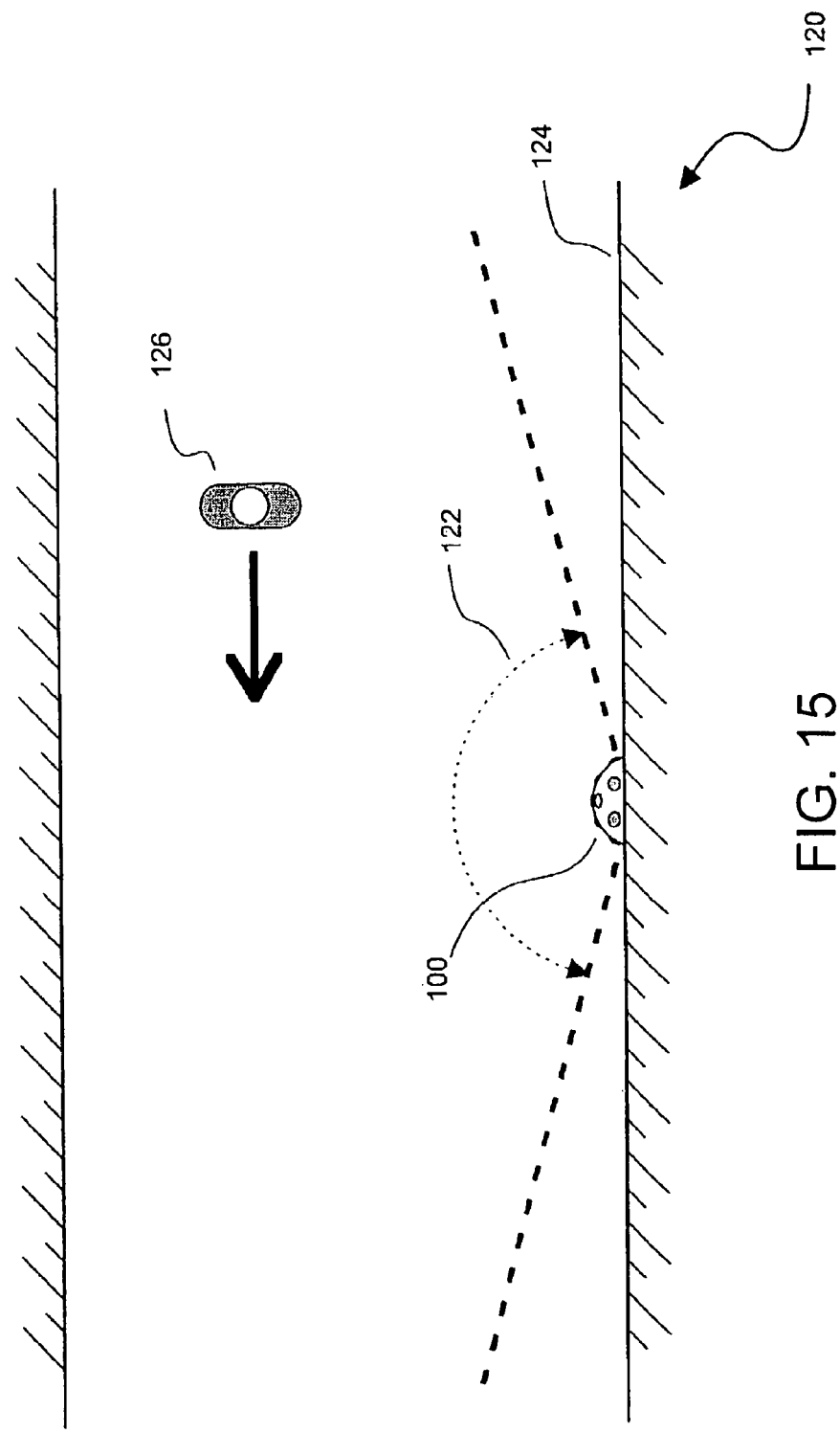
FIG. 15 depicts a system according to the invention mounted on a corridor wall detecting a moving object.

As shown in FIG. 15 in a top view, a sensor head 100 is mounted on the wall of a corridor 120 such that its total field of view 122 covers most of the corridor, and a person 126 walking down the corridor 120 is within the field of view 122.

Figure 16A:
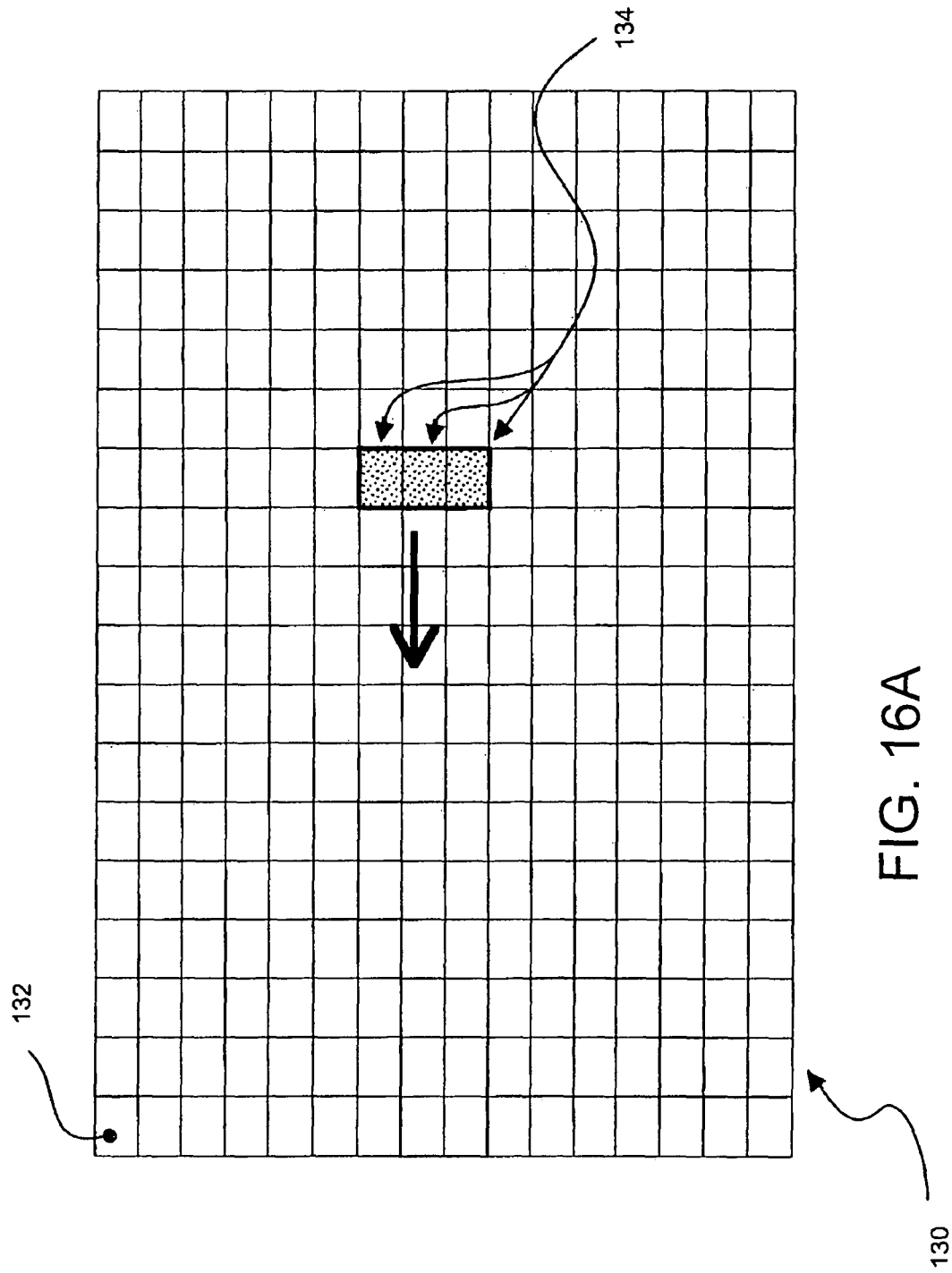
FIG. 16A depicts graphically a range of pixels in a lookup table of a system according to the invention with the image of a moving object located therein.
Figure 16B:
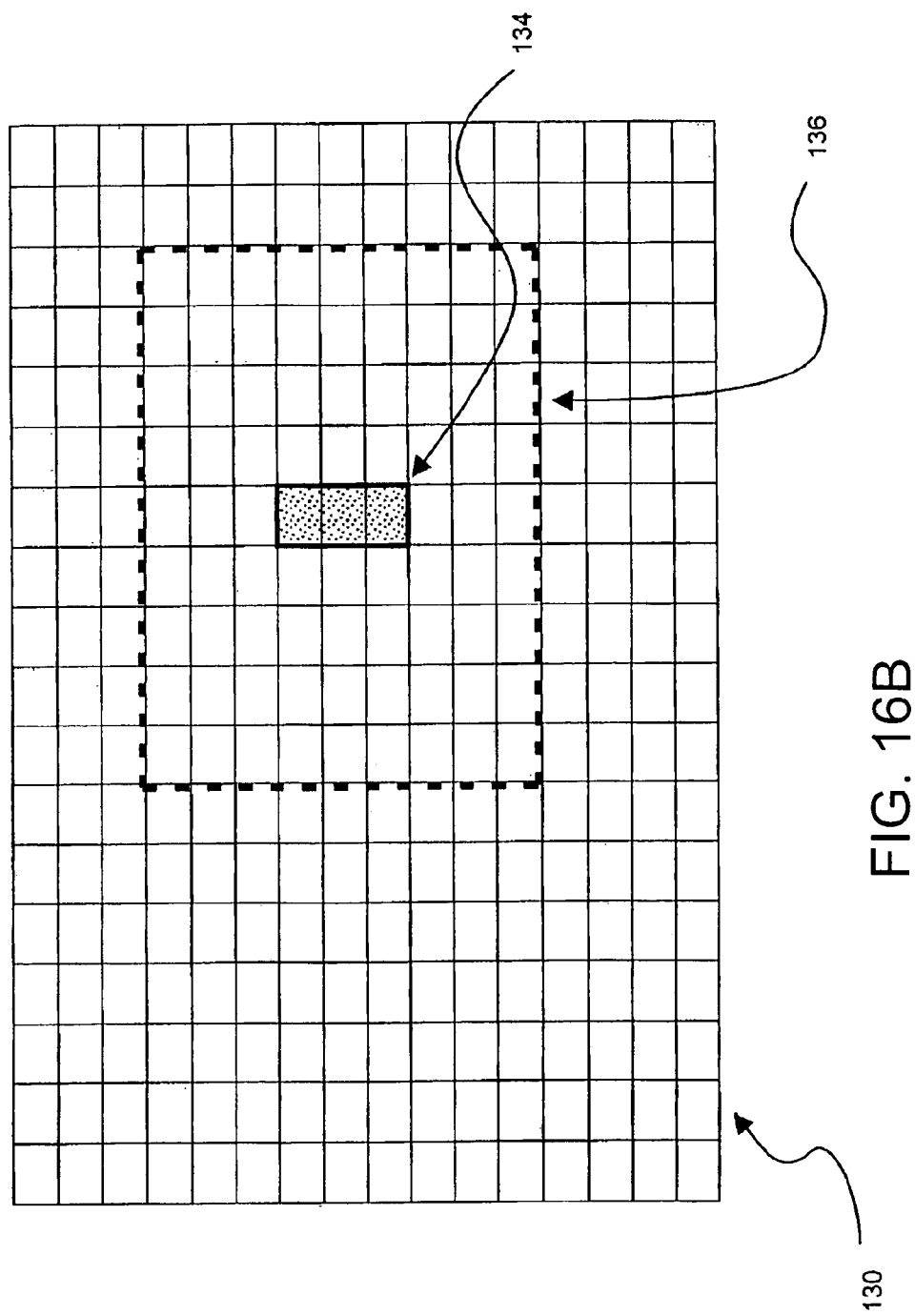
FIG. 16B depicts graphically a range of pixels in a lookup table of a system according to the invention with the image of a moving object located within a view selected therein.
Figure 16C:
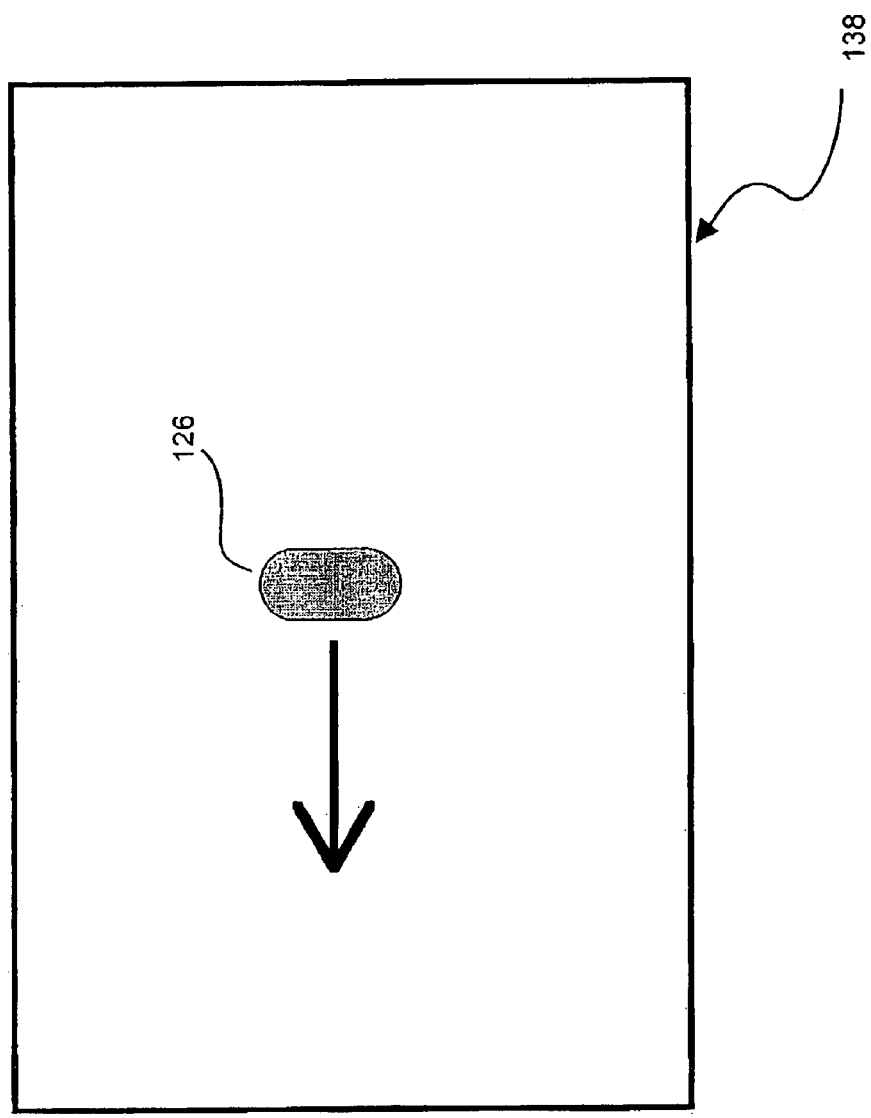
FIG. 16C depicts an image on a display of a system according to the invention.

As represented diagrammatically in FIG. 16A, a lookup table 130 is made up of the pixels 132 that comprise the field of view of a device in accordance with the invention. Within these pixels at a certain point in time, a smaller subset of pixels 134 represent an object that is moving within the sensor head's field of view. As shown in FIG. 16B, the sensor head's processor can be programmed to select a frame of view 136 within the sensor head's total field of view 130 which is centered on the pixels 134 that depict a moving object. As shown in FIG. 16C, when this the pixels included in this frame of view are transmitted to the device's display, it will result in an image 138 within which the image of the moving object detected 126 will be centered.

Figure 17:
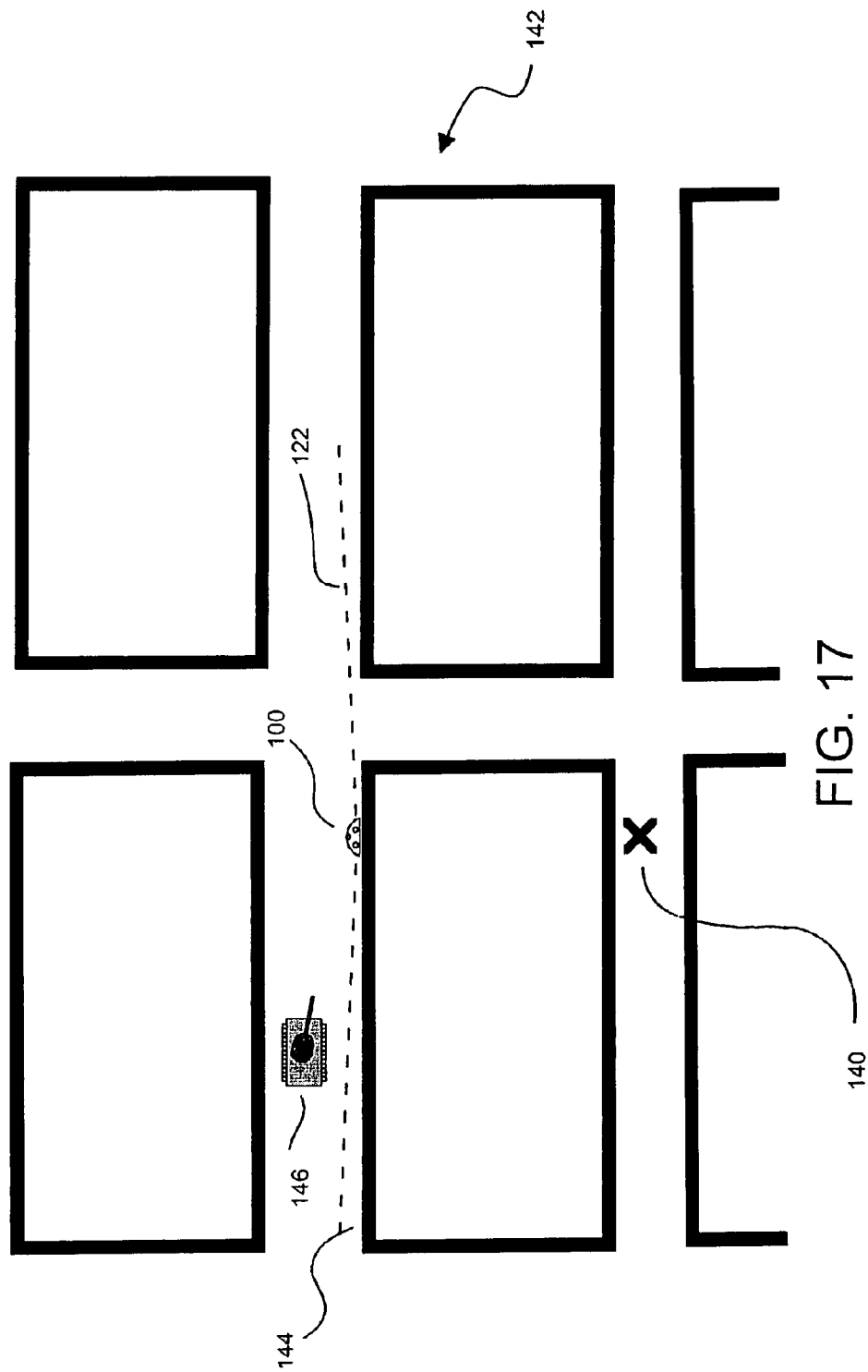
FIG. 17 depicts graphically an urban war zone where a group of soldiers have deployed a system according to the invention.

As shown in FIG. 17, if a group of soldiers 140 operating in an urban environment 142 leaves an intelligent sensor head 100 behind them on the wall 144 of a building, mounted such that the head's field of view 122 encompasses the street, then the sensor head can show, via a wireless connection to a display the soldiers retain, when an enemy, such as a tank 146, comes up behind them and constitutes a possible threat.

Figure 18:
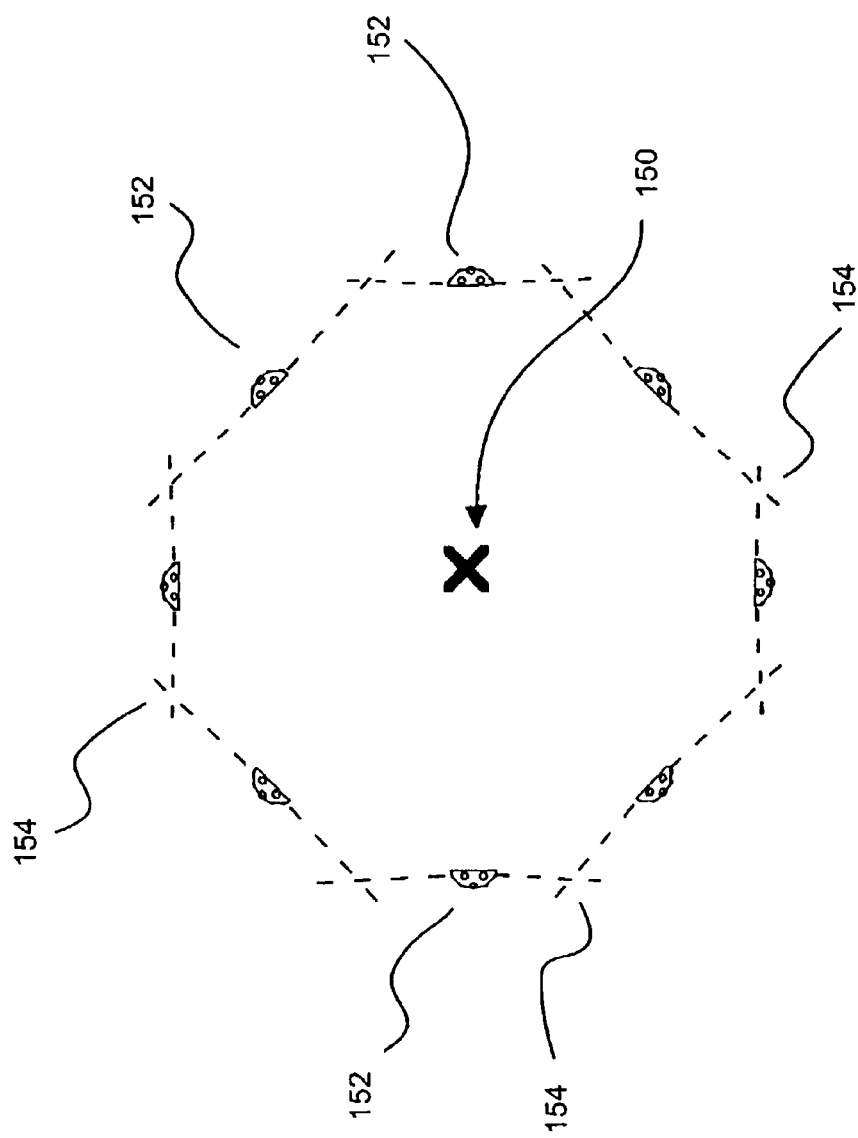
FIG. 18 depicts a group of systems according to the invention deployed around a fixed location.

As shown in FIG. 18, a group of soldiers occupying a position 150 may deploy a plurality of intelligent sensor heads 152 around their position such that the fields of view 154 overlap. In this way, the soldiers may more easily maintain surveillance of their position's perimeter to detect threats and possible attacks.

The systems further include sensor devices including a plurality of sensors disposed on a surface of a body and a mechanism for selecting between the sensors to determine which sensor should provide information about data coming from or passing through a particular location. The body may have any shape or size and the shape and size chosen will depend upon the application. Moreover, the body may comprise the body of a device, such as a vehicle, including a car, tank, airplane, submarine or other vehicle. Additionally, the surface may comprise the surface of a collapsible body to thereby provide a periscope that employs solid state sensors to capture images. In these embodiments, the systems may include a calibration system that provides multiple calibration settings for the sensors. Each calibration setting may correspond to a different shape that the surface may attain. Thus the calibration setting for a periscope that is in a collapse position may be different from the calibration setting employed when the periscope is in an extended position and the surface as become elongated so that sensors disposed on the periscope surface are spaced farther apart.

The systems may include sensors selected from the group of image sensors, CCD sensors, infra-red sensors, thermal imaging sensors, acoustic sensors, and magnetic sensors.

As discussed above, these sensor can be realized hardware devices and systems that include software components operating on an embedded processor or on a conventional data processing system such as a Unix workstation. In that embodiment, the software mechanisms can be implemented as a C language computer program, or a computer program written in any high level language including C++, Fortran, Java or Basic. Additionally, in an embodiment where microcontrollers or DSPs are employed, the software systems may be realized as a computer program written in microcode or written in a high level language and compiled down to microcode that can be executed on the platform employed. The development of such image processing systems is known to those of skill in the art, and such techniques are set forth in Digital Signal Processing Applications with the TMS320 Family, Volumes I, II, and III, Texas Instruments (1990). Additionally, general techniques for high level programming are known, and set forth in, for example, Stephen G. Kochan, Programming in C, Hayden Publishing (1983). It is noted that DSPs are particularly suited for implementing signal processing functions, including preprocessing functions such as image enhancement through adjustments in contrast, edge definition and brightness. Developing code for the DSP and microcontroller systems follows from principles well known in the art.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. A system, comprising
a plurality of displays including a first display and a second display, each display in communication with an image sensor having a field of view for recording an image;
a first eye tracking sensor associated with the first display and a second eye tracking sensor associated with the second display, wherein an eye tracking sensor comprises:
a light emitter for emitting a light beam,
an optical sensor for receiving a light reflected from a viewer's eyes, and
an image processor coupled to the optical sensor for calculating a location of a viewer's focus point and sending the location of the viewer's focus point to the image sensor; and
a processor for:
determining at least one of the plurality of displays the viewer is looking at based on the viewer's focus point,
activating at least one eye tracking sensor associated with the at least one determined display,
tracking the viewer's focus point while the viewer is looking at the at least one determined display, and
selectively adjusting a resolution of at least a portion of an image on the determined display as a function of the viewer's focus point.

2. The device of claim 1, further comprising a display having a high resolution section and a low resolution section and a video processor for displaying the portion of an image in high resolution as a function of the viewer's focus point in that portion.

3. The device of claim 1, further comprising a display having a screen for displaying the image sent by a video processor.

4. The device of claim 1, further comprising a plurality of image sensors, each image sensor having a field of view and recording an image in a respective field of view, the images being combinable with one or more other images to form a scene.

5. The device of claim 1, further comprising a transceiver in connection with the processor, for transmitting the image to a remote location.

6. The device of claim 1, wherein the eye tracking sensor comprises means for tracking the viewer's focus point while the viewer is looking at the respective display.

7. The device of claim 1, wherein the eye tracking sensors comprises means for tracking a viewer's focus point while the viewer is looking at non-corresponding displays.

8. The device of claim 1, wherein the image sensor includes an array of charge-coupled devices.

9. The device of claim 1, wherein the light emitter includes infrared light.

10. The device of claim 1, wherein the optical sensor includes a camera.

11. The device of claim 1, wherein the eye tracking sensor comprises means for detecting a change in the viewer's focus point from a first area to a second area and transmitting the change in viewer's focus point to the image sensor.

12. The device of claim 2, wherein the high resolution section displays the image in color surrounded by the low resolution section having a reduced color.

13. A method for providing an image, comprising
providing a plurality of displays including a first display and a second display, each display in communication with an image sensor having a field of view for recording an image;
providing a first eye tracking sensor associated with the first display and a second eye tracking sensor associated with the second display, wherein an eye tracking sensor comprises:
a light emitter for emitting a light beam,
an optical sensor for receiving a light reflected from a viewer's eyes, and
an image processor coupled to the optical sensor for calculating a location of a viewer's focus point and sending the location of the viewer's focus point to the image sensor;
determining at least one of the plurality of displays the viewer is looking at based on the viewer's focus point,
activating at least one eye tracking sensor associated with the at least one determined display,
tracking the viewer's focus point while the viewer is looking at the at least one determined display; and
selectively adjusting a resolution of at least a portion of an image on the at least one determined display as a function of the viewer's focus point.

14. A system, comprising:
a plurality of displays, including a first display and a second display, each display in communication with at least one of a plurality of image sensors having overlapping fields of view for recording an image;
a first eye tracking sensor associated with a first area of the plurality of displays and a second eye tracking sensor associated with a second area of the plurality of displays, wherein an eye tracking sensor comprises:
a light emitter for emitting a light beam,
an optical sensor for receiving a light reflected from a viewer's eyes, and
an image processor coupled to the optical sensor for calculating a location of a viewer's focus point and sending the location of the viewer's focus point to the at least one of the plurality of image sensors; and
a processor for:
determining an area of the plurality of displays the viewer is looking at based on the viewer's focus point,
determining at least one display associated with the area,
activating at least one eye tracking sensor associated with the at least one determined display,
tracking the viewer's focus point while the viewer is looking at the area of the plurality of displays, and
selectively adjusting a resolution of at least a portion of an image on the area of the plurality of displays as a function of the viewer's focus point.

* * * * *